(12) United States Patent
Chen et al.

(10) Patent No.: US 12,212,736 B2
(45) Date of Patent: Jan. 28, 2025

(54) USING UNREFINED MOTION VECTORS FOR PERFORMING DECODER-SIDE MOTION VECTOR DERIVATION

(71) Applicant: QUALCOMM Incorporated, San Diego, CA (US)

(72) Inventors: Chun-Chi Chen, San Diego, CA (US); Han Huang, San Diego, CA (US); Cheng-Teh Hsieh, Del Mar, CA (US); Wei-Jung Chien, San Diego, CA (US); Zhi Zhang, Munich (DE); Yao-Jen Chang, San Diego, CA (US); Yan Zhang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 228 days.

(21) Appl. No.: 17/809,167

(22) Filed: Jun. 27, 2022

(65) Prior Publication Data

US 2023/0007238 A1 Jan. 5, 2023

Related U.S. Application Data

(60) Provisional application No. 63/217,164, filed on Jun. 30, 2021.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11)

(58) Field of Classification Search
CPC .. H04N 19/105; H04N 19/135; H04N 19/137; H04N 19/176
See application file for complete search history.

(56) References Cited

U.S. PATENT DOCUMENTS 10,511,835 B2 12/2019 Chuang et al.
2018/0041769 A1* 2/2018 Chuang ................ H04N 19/176
(Continued)

OTHER PUBLICATIONS

Bross B., et al., "Versatile Video Coding Editorial Refinements on Draft 10", JVET-T2001-v1, Joint Video Experts Team (JVET) of ITU-T SG 16 WP 3 and ISO/IEC JTC 1/SC 29, 20th Meeting, by Teleconference, Oct. 7-16, 2020, pp. 1-514.
(Continued)

*Primary Examiner* — Jeremiah C Hallenbeck-Huber
(74) *Attorney, Agent, or Firm* — Shumaker & Sieffert, P.A.

(57) ABSTRACT

A device for decoding video data includes a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

32 Claims, 14 Drawing Sheets

(51) Int. Cl.
    *H04N 19/137* (2014.01)
    *H04N 19/176* (2014.01)

(56) References Cited

U.S. PATENT DOCUMENTS

| | | | |
|---|---|---|---|
| 2020/0007888 A1 | 1/2020 | Xu et al. | |
| 2020/0084466 A1 | 3/2020 | Xu et al. | |
| 2020/0169748 A1* | 5/2020 | Chen | H04N 19/521 |
| 2020/0221117 A1* | 7/2020 | Liu | H04N 19/56 |
| 2020/0236387 A1 | 7/2020 | Esenlik et al. | |
| 2020/0280736 A1* | 9/2020 | Wang | H04N 19/463 |
| 2021/0067800 A1* | 3/2021 | Li | H04N 19/57 |
| 2021/0321111 A1* | 10/2021 | Tamse | H04N 19/137 |
| 2021/0321121 A1* | 10/2021 | Zhang | H04N 19/186 |
| 2021/0329257 A1* | 10/2021 | Sethuraman | H04N 19/119 |
| 2022/0201315 A1 | 6/2022 | Zhang et al. | |

OTHER PUBLICATIONS

Chang Y-J., et al., "EE2: Tests of Compression Efficiency Methods Beyond VVC", JVET-V0120-v2, Joint Video Experts Team (JVET) of ITU-T SG 16 WP 3 and ISO/IEC JTC 1/SC 29, 22nd Meeting, by Teleconference, Apr. 20-28, 2021, pp. 1-31.

Chen C-C., et al., "EE2-related: On Spatial MV Propagation and Neighboring Template Block Access for Template Matching and Multi-Pass DMVR", JVET-W0122-v2, Joint Video Experts Team (JVET) of ITU-T SG 16 WP 3 and ISO/IEC JTC 1/SC 29, 23rd Meeting, by teleconference, Jul. 7-16, 2021, pp. 1-4.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

International Search Report and Written Opinion—PCT/US2022/073228—ISA/EPO—Oct. 10, 2022, 11 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

JVET: "VTM Reference Software for VVC", VVC Software_VTM, Project ID: 37, Retrieved on Oct. 24, 2022, pp. 1-2.

Seregin V., et al., "Exploration Experiment on Enhanced Compression Beyond VVC capability (EE2)", JVET-V2024-v3, Joint Video Experts Team (JVET) of ITU-T SG 16 WP 3 and ISO/IEC JTC 1/SC 29, 22nd Meeting, by teleconference, Apr. 20-28, 2021, pp. 1-7.

Seregin V., et al., "Exploration Experiment on Enhanced Compression Beyond VVC Capability", 21. JVET Meeting, Jan. 6, 2021-Jan. 15, 2021, Teleconference, (The Joint Video Exploration Team of ISO/IEC JTC1/SC29/WG11 and ITU-T SG.16 WP 3), No. JVET-U2024-V2, m56284 Feb. 17, 2021, XP030293402, pp. 1-19.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

\* cited by examiner

USING UNREFINED MOTION VECTORS FOR PERFORMING DECODER-SIDE MOTION VECTOR DERIVATION

This application claims the benefit of U.S. Provisional Application No. 63/217,164, filed Jun. 30, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to decoder-side motion vector derivation techniques (e.g., template matching, bilateral matching, decoder-side MV refinement, bi-directional optical flow). These techniques may be applied to any of the existing video codecs, such as ITU-T H.265/HEVC (High Efficiency Video Coding), ITU-T H.266/VVC (Versatile Video Coding), Essential Video Coding (EVC), in future video coding standards, or performed by AOMedia Video 1 (AV1) codecs.

In one example, a method of decoding video data, the method comprising: determining a deterministic bounding box from which to retrieve reference samples of reference pictures of video data for performing decoder-side motion vector derivation (DMVD) for a current block of the video data; deriving a motion vector for the current block according to DMVD using the reference samples within the deterministic bounding box; forming a prediction block using the motion vector; and decoding the current block using the prediction block.

In another example, a device for decoding video data includes a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

In another example, a computer-readable storage medium has stored thereon instructions that, when executed, cause a processor to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

In another example, a device for decoding video data includes means for determining a deterministic bounding box from which to retrieve reference samples of reference pictures of video data for performing decoder-side motion vector derivation (DMVD) for a current block of the video data; means for deriving a motion vector for the current block according to DMVD using the reference samples within the deterministic bounding box; means for forming a prediction block using the motion vector; and decoding the current block using the prediction block.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) continues to study the potential need for standardization of future video coding technology with a compression capability that significantly exceeds that of the HEVC standard (including its current extensions and near-term extensions for screen content coding and high-dynamic-range coding). The groups work together on this exploration activity in a joint collaboration effort known as the Joint Video Exploration Team (JVET) to evaluate compression technology designs proposed by their experts in this area.

Reference software, i.e., VVC Test Model 10 (VTM 10.0) is available from vcgit.hhi.fraunhofer.de/jvet/VVCSoftware_VTM. The ITU-T H.266/Versatile Video Coding (VVC) specification, Bross et al., Joint Video Experts Team (JVET) of ITU-T SG 16 WP 3 and ISO/IEC JTC 1/SC 29, 20th Meeting, by teleconference, 7-16 Oct. 2020, Document JVET-T2001-v1, available at jvet-experts.org/doc_end_user/documents/20_Teleconference/wg11/JVET-T2001-v1.zip. An algorithm description of VTM 10.0 is available from jvet-experts.org/doc_end_user/documents/20_Teleconference/wg11/JVET-T2002-v3.zip.

Figure 1:
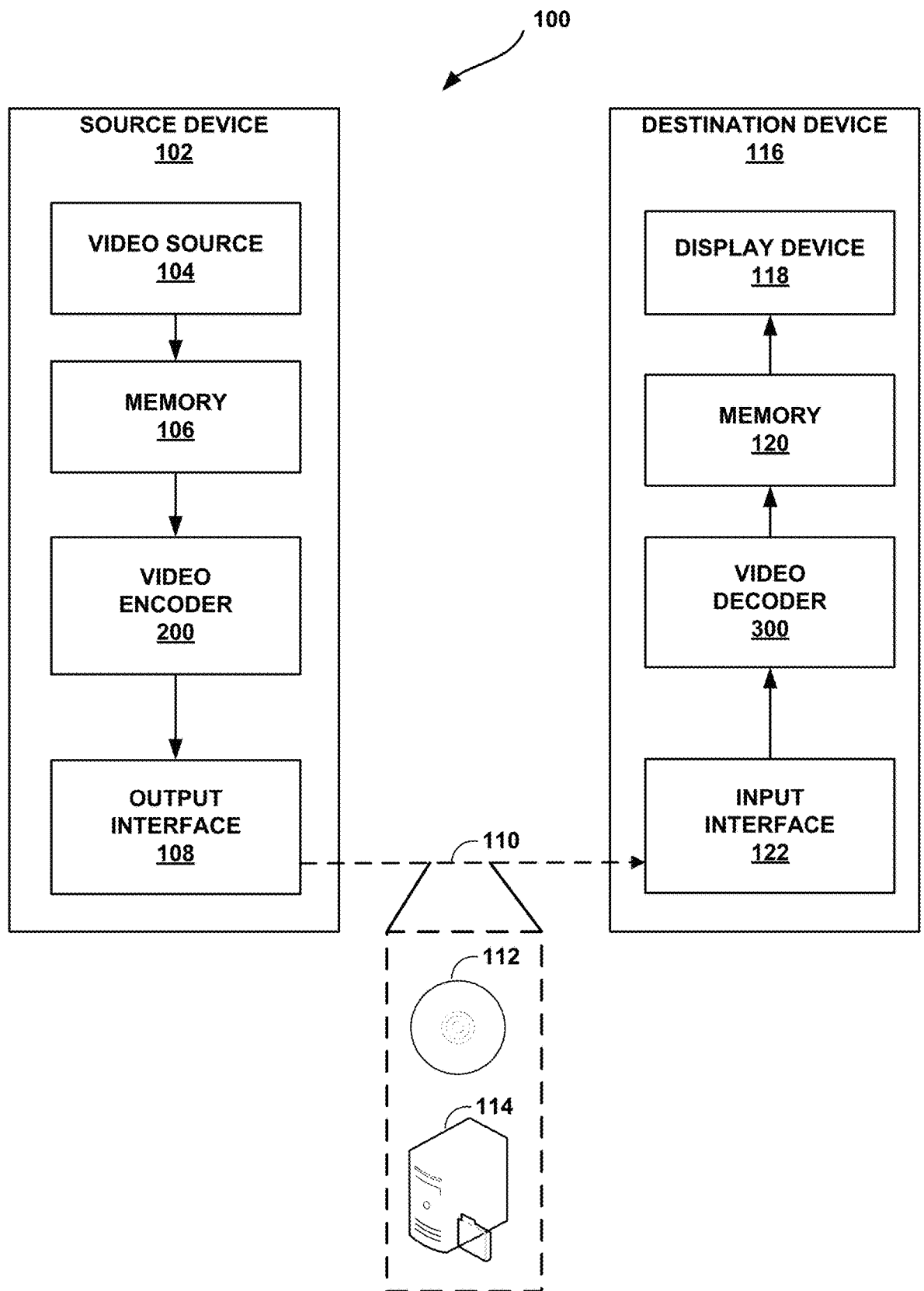
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for using unrefined motion vectors to perform decoder-side motion vector derivation (DMVD). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for using unrefined motion vectors to perform decoder-side motion vector derivation (DMVD). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use unrefined motion vectors to perform decoder-side motion vector derivation (DMVD).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

In HEVC, the largest coding unit in a slice is called a coding tree block (CTB) or coding tree unit (CTU). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e., inter or intra. An inter-coded CU may be further partitioned into 2 or 4 prediction units (PUs) or become just one PU when further partitioning does not apply. When two PUs are present in one CU, the two Pus may be half size rectangles or two rectangle size with ¼ or ¾ size of the CU. When the CU is inter-coded, each PU has one set of motion information, which is derived with a unique inter prediction mode.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2B:
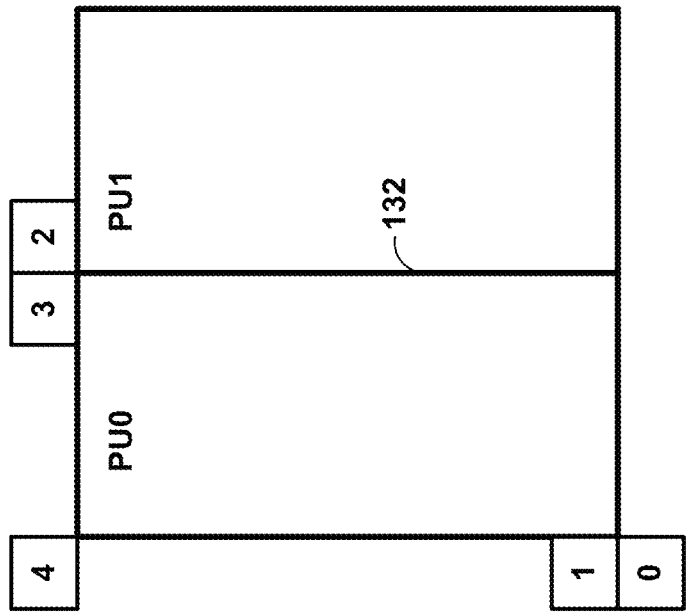
FIGS. 2A and 2B are conceptual diagrams illustrating example spatial neighboring motion vector candidates for coding motion vectors in merge mode and advanced motion vector prediction (AMVP) mode.
Figure 2A:
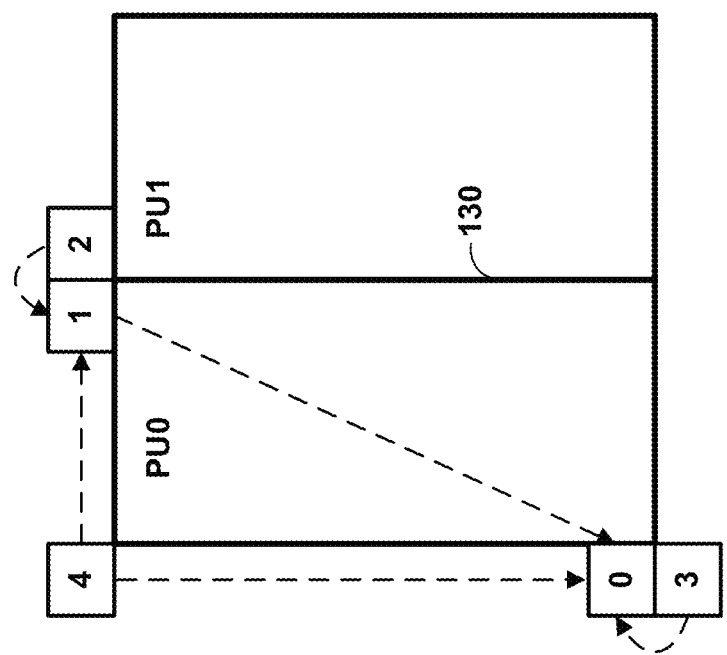

FIGS. 2A and 2B are conceptual diagrams illustrating example spatial neighboring motion vector candidates for coding motion vectors in merge mode and advanced motion vector prediction (AMVP) mode. In particular, FIG. 2A depicts spatial neighboring motion vector (MV) candidates to PU0 130 for merge mode, while FIG. 2B depicts spatial neighboring MV candidates to PU0 132 for AMVP mode.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined.

On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

According to HEVC, spatial MV candidates are derived from the neighboring blocks shown in FIGS. 2A and 2B, for a specific PU (PU0), although the methods generating the candidates from the blocks differ for merge and AMVP modes. In merge mode, up to four spatial MV candidates can be derived for PU0 130 with the orders showed on FIG. 2A with numbers, and the order is the following: left (0, A1), above (1, B1), above right (2, B0), below left (3, A0), and above left (4, B2).

In AVMP mode, the neighboring blocks are divided into two groups: left group consisting of the block 0 and 1, and above group consisting of the blocks 2, 3, and 4 as shown in FIG. 2B. For each group, the potential candidate in a neighboring block to PU0 132 referring to the same reference picture as that indicated by the signaled reference index has the highest priority to be chosen to form a final candidate of the group. It is possible that not all neighboring blocks contain a motion vector pointing to the same reference picture. Therefore, if such a candidate cannot be found, the first available candidate may be scaled to form the final candidate; thus, the temporal distance differences can be compensated.

Figures 3A, 3B:
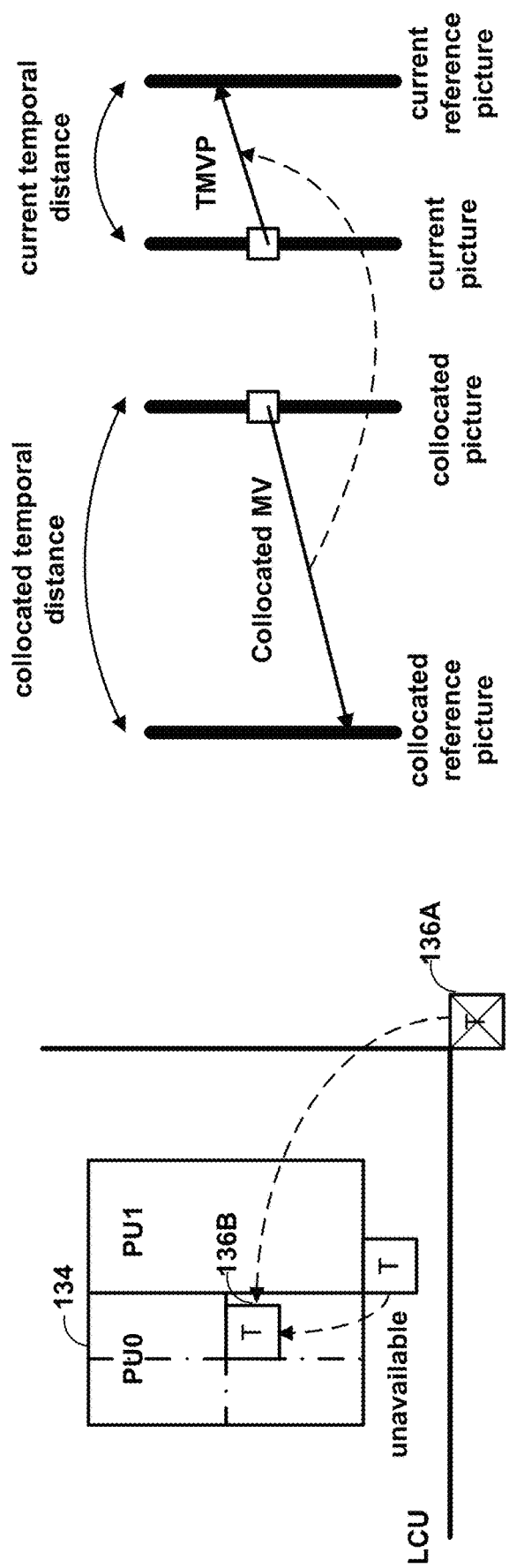
FIGS. 3A and 3B are conceptual diagrams illustrating temporal motion vector prediction techniques.

FIGS. 3A and 3B are conceptual diagrams illustrating temporal motion vector prediction (TMVP) techniques. In particular, FIG. 3A depicts locations of a TMVP candidate for PU0 134, labeled "T," while FIG. 3B depicts motion vector scaling based on temporal distances between pictures.

If TMVP is enabled and a TMVP candidate is available, a video coder may add the TMVP candidate into the MV candidate list after the spatial MV candidates. The process of motion vector derivation for the TMVP candidate is the same for both merge and AMVP modes. However, the target reference index for the TMVP candidate in the merge mode may be set to 0.

The primary block location for TMVP candidate derivation is the bottom right block outside of the collocated PU, as shown in FIG. 3A as a block 136A, to compensate the bias to the above and left blocks used to generate spatial neighboring candidates. However, if block 136A is located outside of the current CTB row or motion information is not available, the TMVP candidate may be substituted with a center block of the PU, block 136B.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 3B.

HEVC includes various other motion vector prediction techniques, e.g., as discussed below.

It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, artificial motion vector candidates may be generated and inserted at the end of the list until the list is full with candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. A video coder may apply a pruning process to solve this problem. Using the pruning process, the video coder may compare one candidate against the others in the current candidate list to avoid inserting identical candidate in certain extent. To reduce the complexity, only a limited number of pruning process iterations may be applied, instead of comparing each potential one with all the other existing ones.

Figure 4:
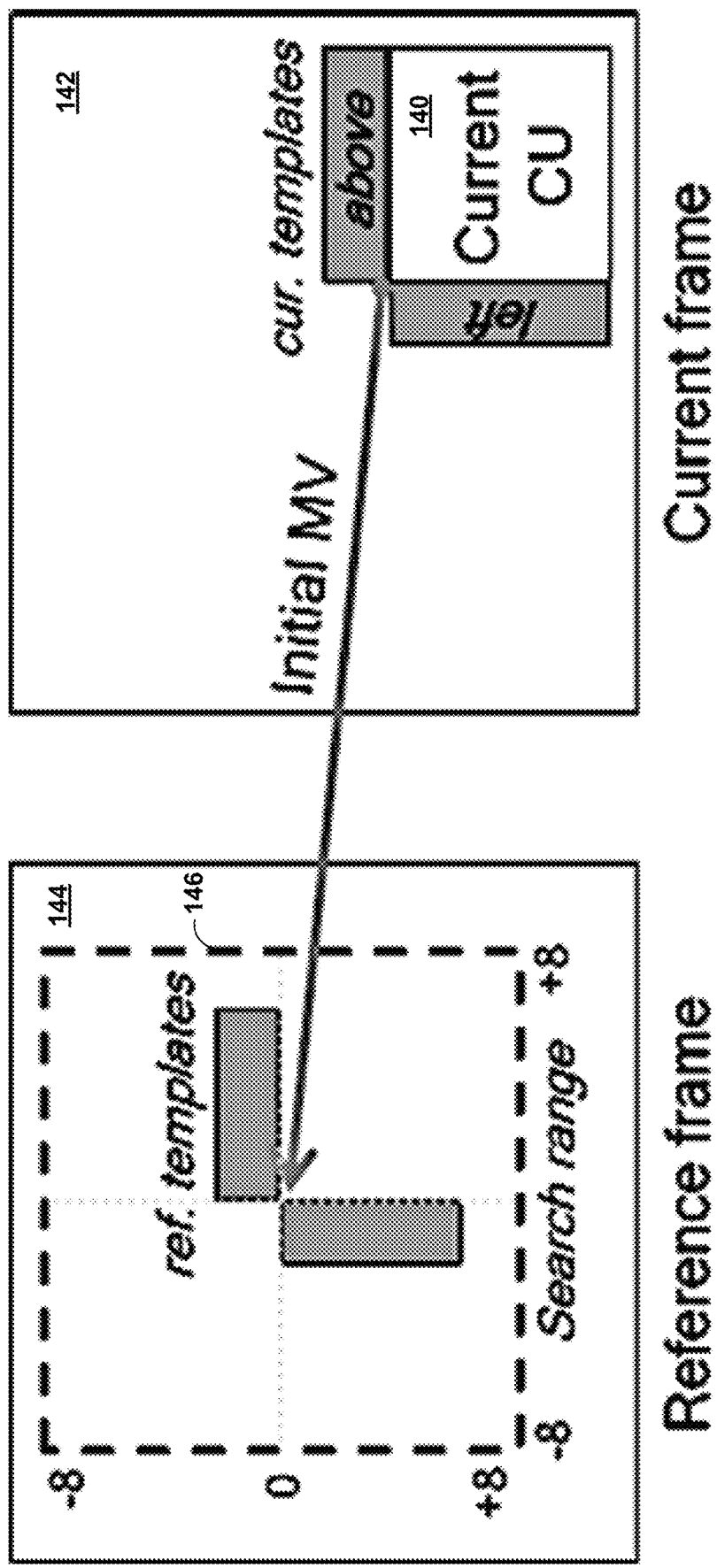
FIG. 4 is a conceptual diagram illustrating template matching prediction for motion vector coding.

FIG. 4 is a conceptual diagram illustrating template matching (TM) prediction for motion vector coding. Template matching (TM) prediction is a special merge mode based on Frame-Rate Up Conversion (FRUC) techniques. With this mode, motion information of a current block (such as current CU 140) is not signalled but derived at decoder side (e.g., by video decoder 300). Video encoder 200 may also perform these techniques during motion compensation. TM is applied to both AMVP mode and regular merge mode. In AMVP mode, MVP candidate selection is determined based on template matching to pick up the one which reaches the minimal difference between current block template and reference block template. In regular merge mode, a TM mode flag is signalled to indicate the use of TM and then TM is applied to the merge candidate indicated by merge index for MV refinement.

As shown in FIG. 4, template matching may be used to derive motion information of current CU 140 by finding the closest match between a template (top and/or left neighboring blocks of the current CU) in current picture 142 and a block (same size to the template) in reference picture 144. With an AMVP candidate selected based on initial matching error, its MVP is refined by template matching within search area 146. With a merge candidate indicated by a signaled merge index, its merged MVs corresponding to L0 and L1 are refined independently by template matching and then the less accurate one is further refined again with the better one as a prior.

When a motion vector points to a fractional sample position, motion compensated interpolation is needed. To reduce complexity, bi-linear interpolation instead of regular 8-tap DCT-IF interpolation is used for both template matching to generate templates on reference pictures. The matching cost C of template matching may be calculated as follows:

$$C = SAD + w \cdot (|MV_x - MV_x^s| + |MV_y - MV_y^s|) \quad (1)$$

In formula (1) above, w is a weighting factor which may be set to 4 (e.g., based on empirical testing), MV and $MV^s$ indicate the currently tested MV and the initial MV (i.e., a MVP candidate in AMVP mode or merged motion in merge mode), respectively. Sum of absolute difference (SAD) may be used as the matching cost of template matching.

When TM is used, motion may be refined using luma samples only. The derived motion may be used for both luma and chroma for MC inter prediction. After the MV is decided, a final MC may be performed using an 8-tap interpolation filter for luma and a 4-tap interpolation filter for chroma.

MV refinement is a pattern-based MV search with the criterion of template matching cost and a hierarchical structure. Two search patterns may be supported: a diamond search and a cross search for MV refinement. The hierarchical structure specifies an iterative process to refine MV, starting at a coarse MVD precision (e.g., quarter-pel) and ending at a fine one (e.g., ⅛-pel). The MV may be directly searched at quarter luma sample MVD precision with diamond pattern, followed by quarter luma sample MVD precision with cross pattern, and then this is followed by one-eighth luma sample MVD refinement with cross pattern. Search range 146 of MV refinement may be set equal to (−8, +8) luma samples around the initial MV. When the current block is of bi-prediction, both MVs are refined independently, and then the best of which (in terms of matching cost) is set as a prior to further refine the other MV with BCW weight values.

Figure 5:
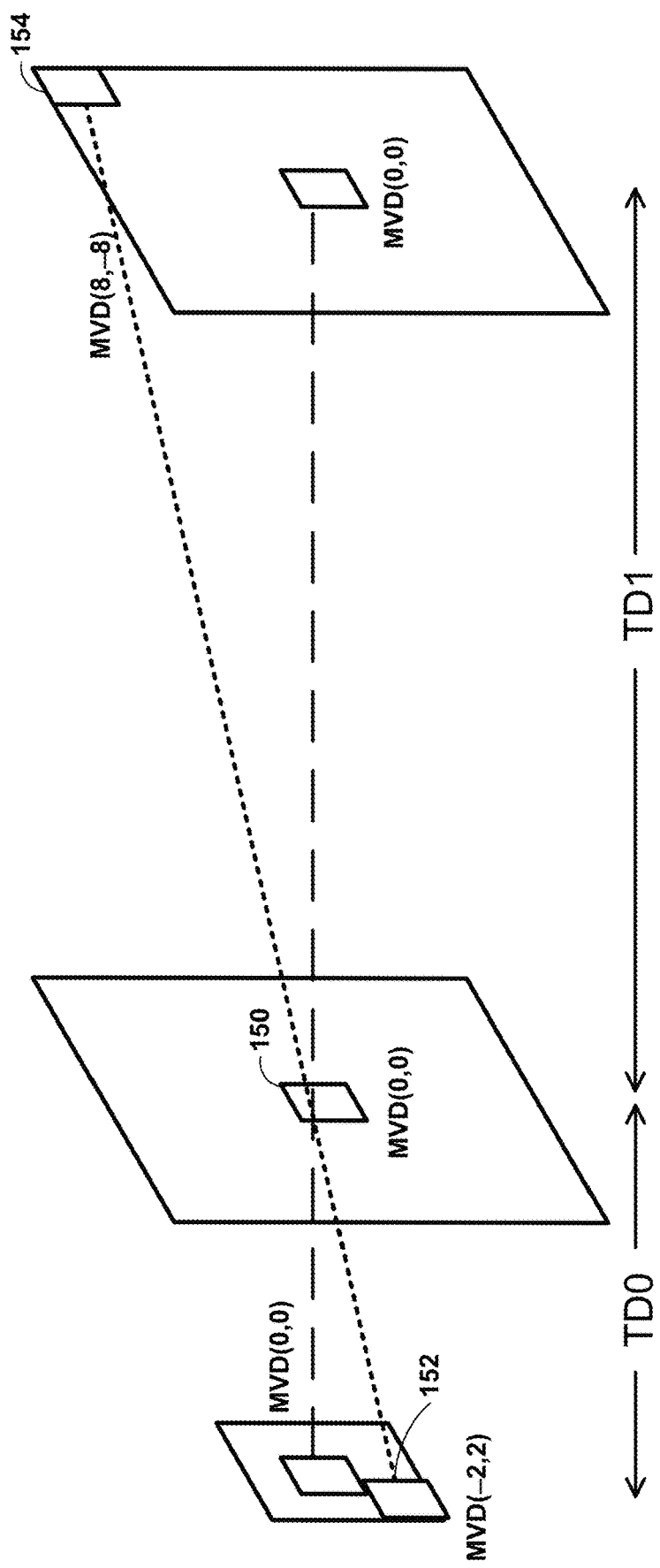
FIG. 5 is a conceptual diagram illustrating motion vector difference (MVD) values for blocks in reference pictures having different temporal distances (TDs) to a current picture including a current block.

FIG. 5 is a conceptual diagram illustrating motion vector difference (MVD) values for blocks in reference pictures having different temporal distances (TDs) to a current picture including current block 150. Bilateral Matching (a.k.a., Bilateral Merge or BM) prediction is another merge mode based on Frame-Rate Up Conversion (FRUC) techniques. When a video coder (such as video encoder 200 or video decoder 300) determines to apply the BM mode, the video coder may derive two initial motion vectors MV0 and MV1. The video coder may code a merge candidate index representing the merge candidate in a constructed merge list. The video coder may perform a Bilateral Matching search around MV0 and MV1. The video coder may derive the final MV0' and MV1' based on the minimum Bilateral Matching cost.

The motion vector difference MVD0 (denoted by MV0'−MV0) and MVD1 (denoted by MV1'−MV1) pointing to reference blocks 152, 154 may be proportional to the temporal distances (TD), e.g., TD0 and TD1, between the current picture and the two reference pictures. The temporal distances may represent differences between picture order count (POC) values for the respective pictures. FIG. 5 shows an example of MVD0 and MVD1, where TD1 is 4 times that of TD0.

Figure 6:
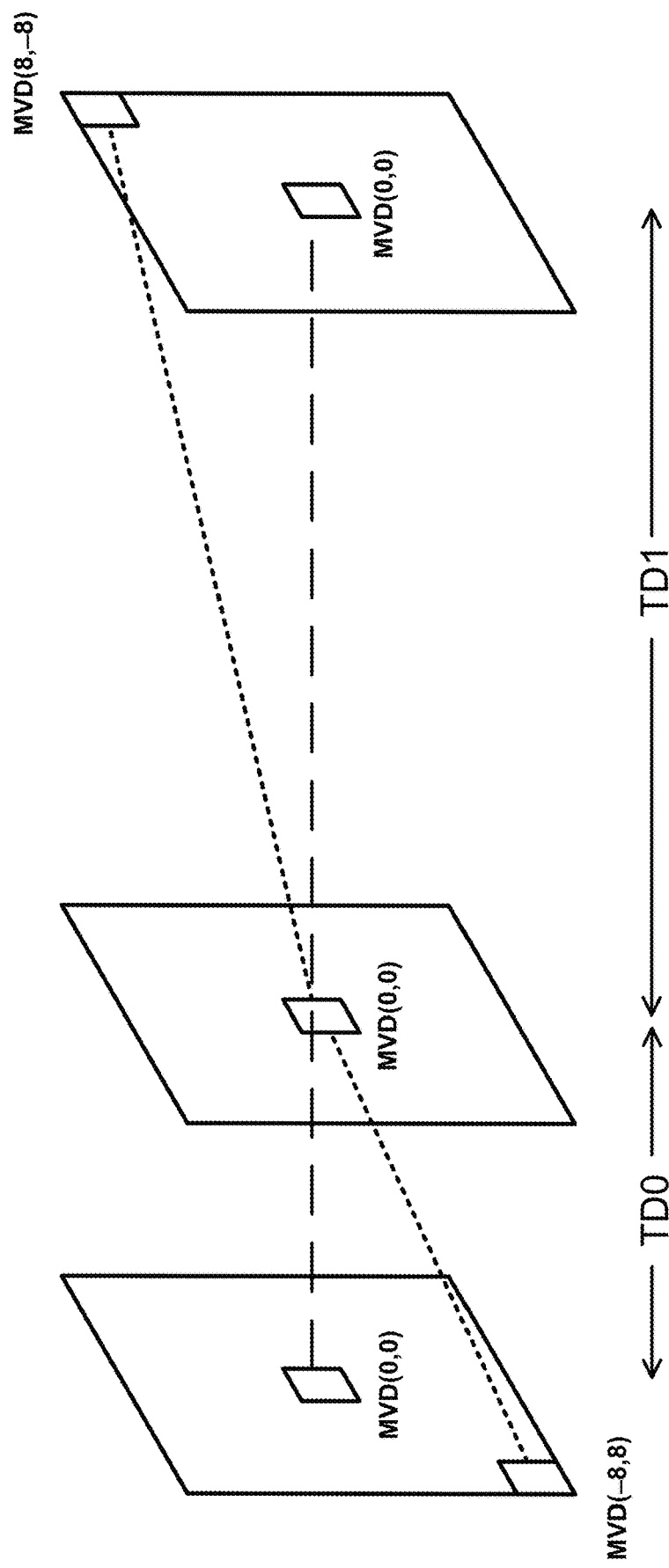
FIG. 6 is a conceptual diagram illustrating an example in which two MVDs are mirrored regardless of temporal distances.

FIG. 6 is a conceptual diagram illustrating an example in which two MVDs are mirrored regardless of temporal distances. FIG. 6 depicts an optional design in which MVD0 and MVD1 are mirrored regardless of TD0 and TD1. In the example of FIG. 6, MVD0 and MVD1 are mirrored, where TD1 is 4 times of TD0.

Figure 7:
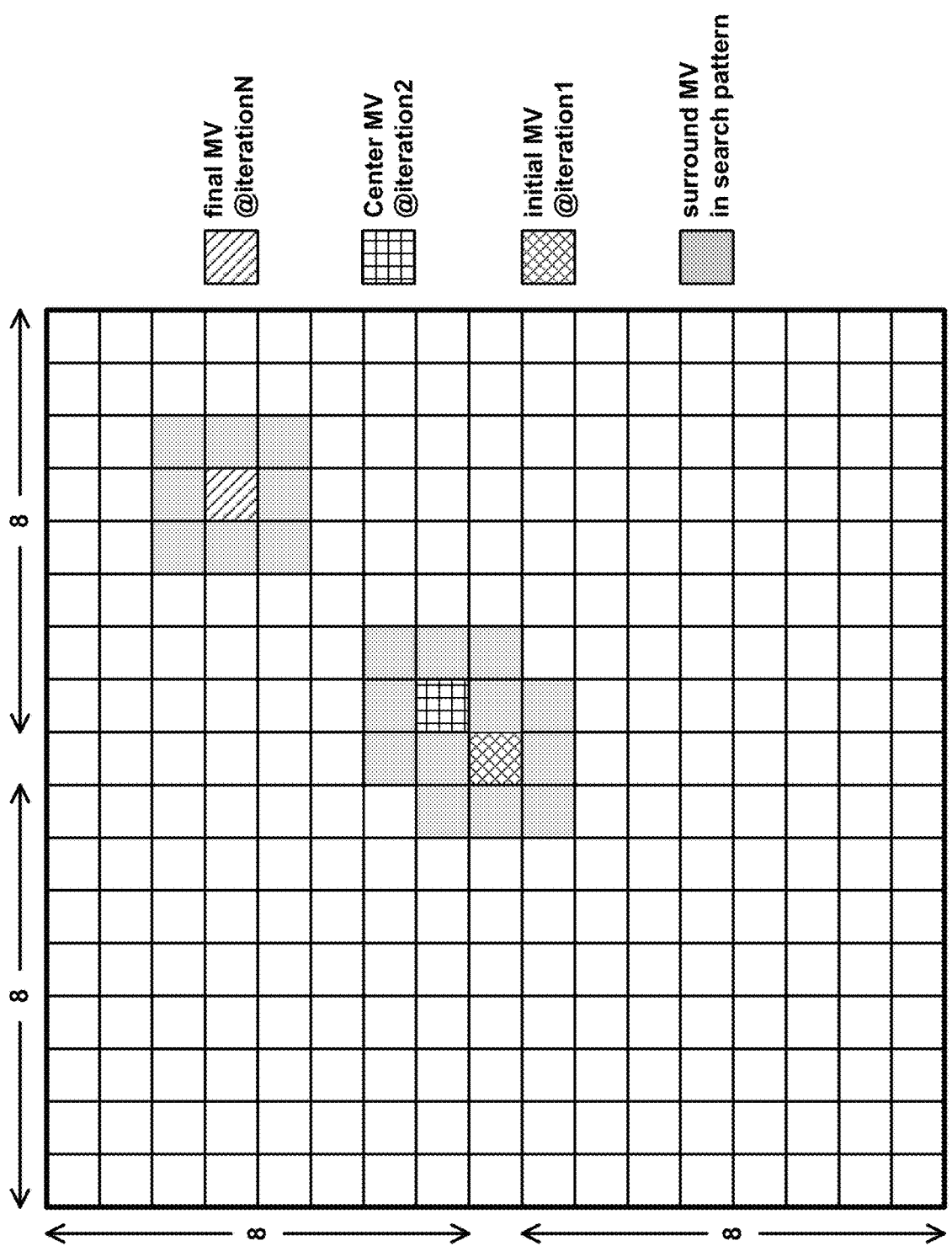
FIG. 7 is conceptual diagram illustrating an example of a 3×3 square search pattern in a bilateral matching search range.

FIG. 7 is conceptual diagram illustrating an example of a 3×3 square search pattern in a bilateral matching search range. According to bilateral matching, a video coder (such as video encoder 200 and video decoder 300) may perform a local search around the initial MV0 and MV1 to derive the final MV0' and MV1'. The video coder may apply the local search to a 3×3 square search pattern and loop through the search range [−8, 8]. In each search iteration, the video coder may calculate the bilateral matching cost of the eight surrounding MVs in the search pattern and compare these costs to the bilateral matching cost of the center MV. The MV which has minimum bilateral matching cost becomes the new center MV in the next search iteration. The video coder may terminate the local search when the current center MV has a minimum cost within the 3×3 square search pattern or the local search reaches the pre-defined maximum search iteration. FIG. 7 shows an example of the 3×3 square search pattern in the search range [−8, 8].

Figure 8:
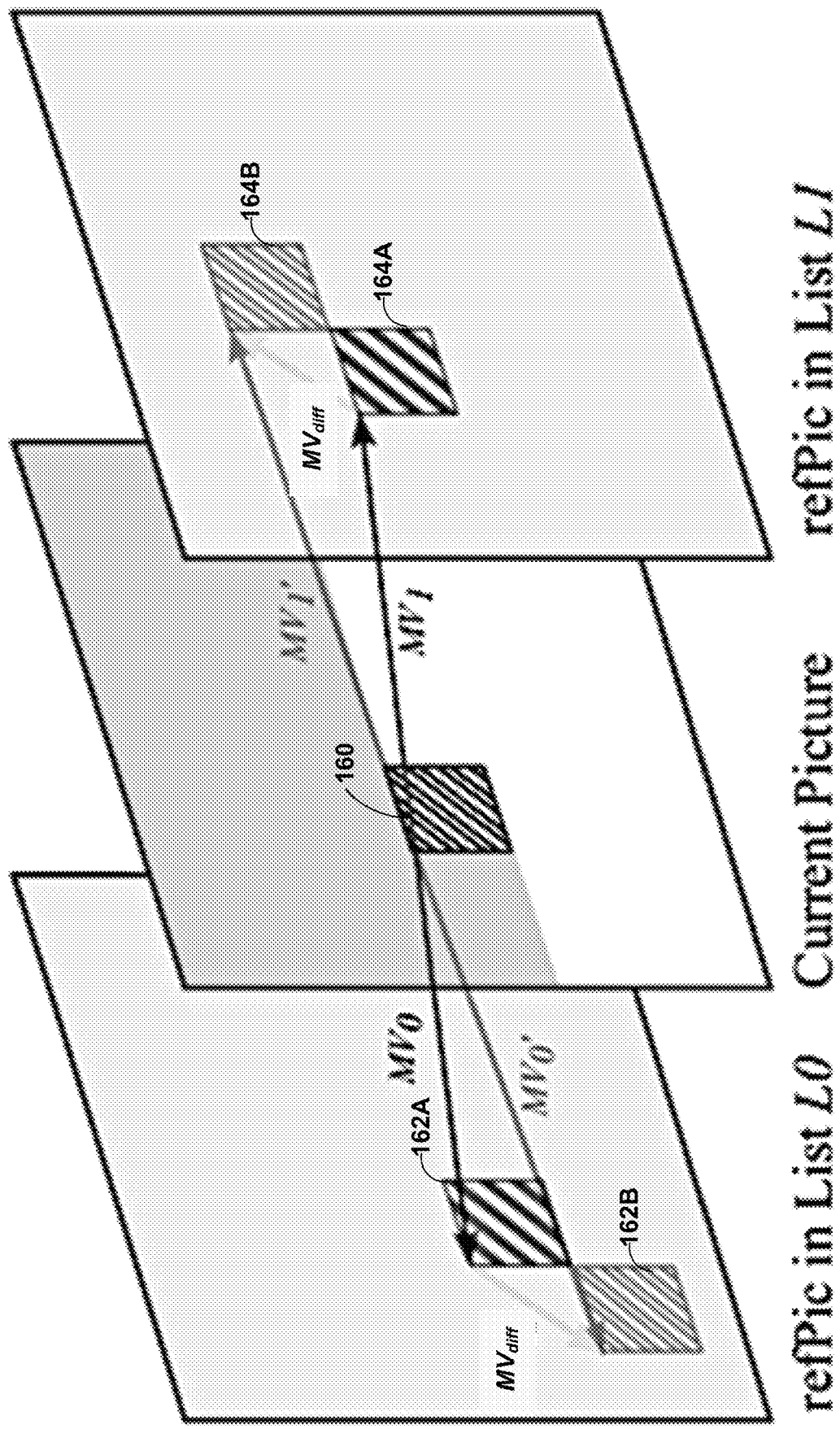
FIG. 8 is a conceptual diagram illustrating an example of refining a motion vector using decoder-side motion vector refinement (DMVR).

FIG. 8 is a conceptual diagram illustrating an example of refining a motion vector using decoder-side motion vector refinement (DMVR) for current block 160. To increase the accuracy of the MVs of the merge mode, a decoder side motion vector refinement (DMVR) is applied in VVC. Both video encoder 200 and video decoder 300 may perform the DMVR process. In bi-prediction operation, a refined MV is searched around initial MVs in the reference picture list L0 and reference picture list L1. The video coder, according to the DMVR technique, calculates the distortion between two candidate blocks 162A, 164A in the reference picture list L0 and list L1. As illustrated in FIG. 8, the SAD between candidate blocks 162B, 164B based on each MV candidate around the initial MV is calculated. The MV candidates 162B, 164B with the lowest SAD becomes the refined MV and used to generate the bi-predicted signal.

The refined MV derived by DMVR process is used to generate the inter prediction samples and also used in temporal motion vector prediction for future pictures coding. While the original MV is used in deblocking process and also used in spatial motion vector prediction for future CU coding. DMVR is a subblock-based merge mode with a pre-defined maximum processing unit of 16×16 luma samples. When the width and/or height of a CU are larger than 16 luma samples, the CU may be further split into subblocks with width and/or height equal to 16 luma samples.

In DMVR, the search points are surrounding the initial MV and the MV offset obey the MV difference mirroring rule. In other words, any points that are checked by DMVR, denoted by candidate MV pair (MV0, MV1) obey the following two equations:

MV0'=MV0+MV_offset

MV1'=MV1−MV_offset

In the equations above, MV_offset represents the refinement offset between the initial MV and the refined MV in one of the reference pictures. The refinement search range is two integer luma samples from the initial MV. The searching includes the integer sample offset search stage and fractional sample refinement stage.

A video coder may perform a 25 points full search for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$E_{x,y} = A(x-x_{min})^2 + B(y-y_{min})^2 + C$ where $(x_{min}, y_{min})$ corresponds to the fractional position with the least cost and C corresponds to the minimum cost value. Solving the above equations using the cost value of the five search points, the $(x_{min}, y_{min})$ may be computed as:

$x_{min} = (E_{-1,0} - E_{1,0})/2(E_{-1,0} + E_{1,0} - 2E_{0,0})$ $y_{min} = (E_{0,-1} - E_{0,1})/2(E_{0,-1} + E_{0,1} - 2E_{0,0})$ The value of $x_{min}$ and $y_{min}$ may be automatically constrained to be between −8 and 8, since all cost values are positive and the smallest value is E(0, 0). This corresponds to half pixel (pel) offset with 1/16th-pel MV accuracy in VVC. The computed fractional $(x_{min}, y_{min})$ are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, may be padded from those available samples.

In VVC, DMVR is enabled if the following conditions are all satisfied:
CU level merge mode with bi-prediction MV
One reference picture is in the past and another reference picture is in the future with respect to the current picture
The distances (i.e., POC difference) from both reference pictures to the current picture are same
CU has more than 64 luma samples
Both CU height and CU width are larger than or equal to 8 luma samples
BCW weight index indicates equal weight
WP is not enabled for the current block
CIIP mode is not used for the current block This disclosure recognizes that there may be hardware implementation issues relating to the DMVD methods discussed above (e.g., TM, BM, DMVR, multi-pass DMVR (U.S. Provisional Application No. 63/129,221, filed Dec. 22, 2020)). In particular, this disclosure recognizes two major hardware implementation issues: spatial motion vector propagation and neighboring reconstruction sample accessing.

Spatial motion vector propagation with refinement vector information to subsequent blocks for spatial motion vector prediction is a critical hardware implementation burden for all DMVD methods. Motion field reconstruction, reference sample fetching and motion compensation (i.e., all operations that requires accessing reference samples, such as interpolation process and DMVD methods) are usually separated in different pipeline stages and the first two have to be done several cycles (or a few CTUs) ahead of motion compensation to ensure reference samples are always ready on chip for interpolation. Since the refinement vector information is unknown during the first two stages, all three can only be done sequentially which breaks the pipeline design and increase decoding latency.

One work-around solution is to fetch more reference samples to cover all possible ones that may be used during motion compensation; however, due to spatial MV prediction, the refinement motion information may carry over to subsequent blocks and accumulates spatially, resulting in an indeterminable size of reference samples to be fetched from reference pictures. As a result, there is nothing different from fetching everything from reference pictures that requires increasing on-chip memory buffer to keep them and would hurt cache hit ratio. Another work-around solution is to stop propagating refinement vector information to subsequent blocks in the current picture, at the risk of losing MV prediction efficiency significantly.

Accessing neighboring reconstruction samples for template matching to generate a current block template also incurs longer latency in decoding. Without template matching, inter blocks can be reconstructed independently regardless of neighboring block reconstruction (unlike intra block which has to wait for neighboring block reconstruction to perform intra prediction). However, template matching requires accessing neighboring reconstructed samples, which implies that certain inter-dependency is introduced to current block and neighboring block reconstruction in inter prediction, resulting in increase of decoding latency.

Video encoder 200 and video decoder 300 of FIG. 1 and of FIGS. 9 and 10 below may be configured to perform techniques that may overcome these issues.

In one example, video encoder 200 and video decoder 300 may be configured with a constrained search range for DMVD. While referred to as "decoder-side motion vector derivation," it should be understood that video encoder 200 may also perform DMVD techniques, such that video data used for reference by video encoder 200 accurately reflects the video data decoded and used for reference by video decoder 300. In particular, video encoder 200 includes a decoder loop as well, during which DMVD techniques may be performed. Thus, both video encoder 200 and video decoder 300 may perform DMVD techniques of this disclosure.

A search range constraint may be imposed on decoder-side motion vector derivation (DMVD) techniques (such as TM, BM, DMVR, multi-pass DMVR) performed by video encoder 200 and video decoder 300 to limit the number of reference samples fetched from reference frames within a deterministic bounding box, which contains the largest possible reference area of a reference picture. Without loss of generality, the following discussion includes description only of the uni-prediction case. However, the same techniques can be directly applied to bi-prediction cases.

Figure 9:
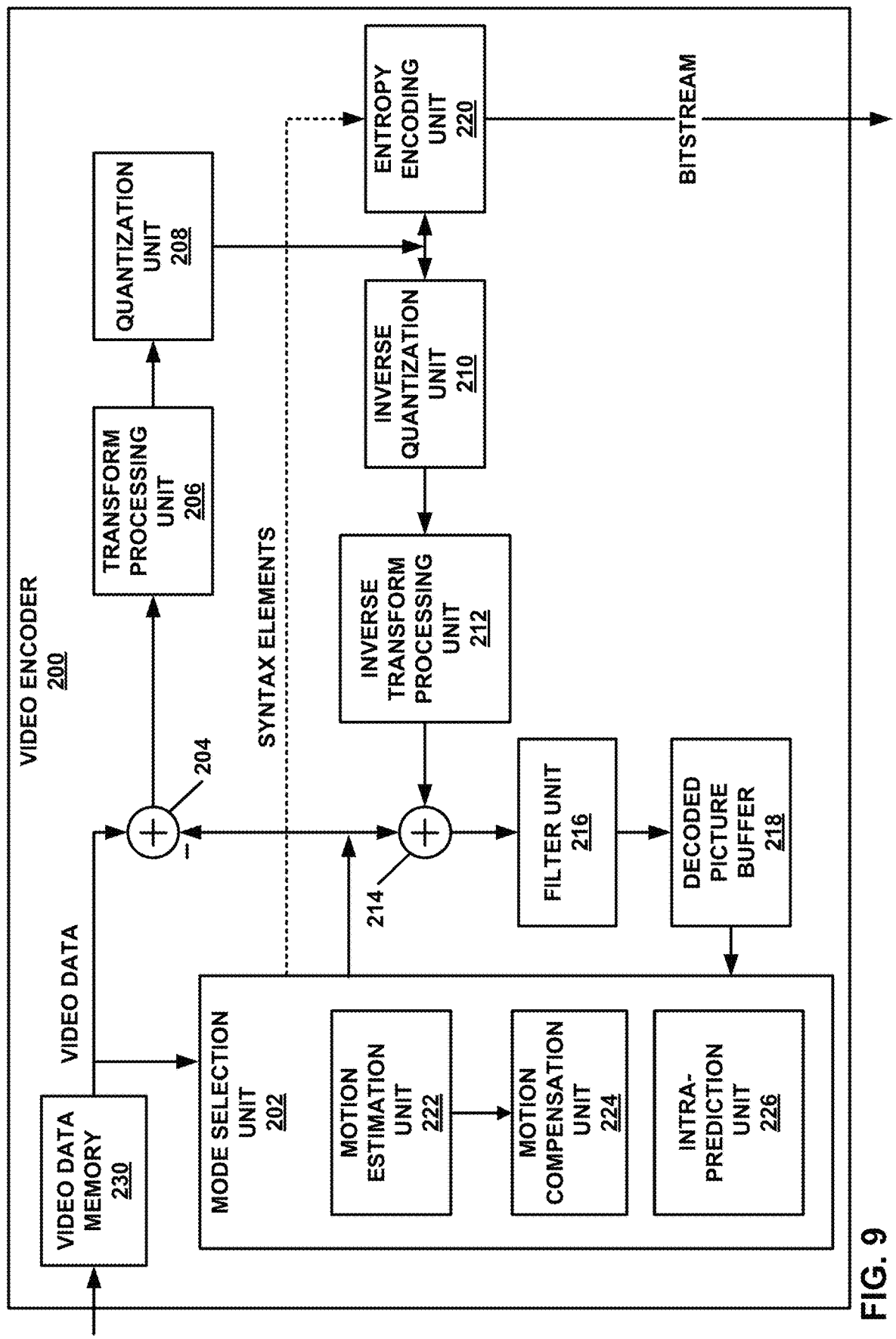
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors.

Motion compensation unit 224 may be configured to perform any of the various decoder-side motion vector derivation (DMVD) techniques of this disclosure. While referred to as "decoder-side," it should be understood that video encoder 200 may also perform these techniques, such that reference blocks identified by the derived/refined motion vectors are the same. The term "decoder-side" is used because the decoder (e.g., video decoder 300) is able to derive/refine motion vectors for blocks using one or more various techniques without additional information signaled by video encoder 200.

In accordance with techniques of this disclosure, motion compensation unit 224 may determine a deterministic bounding box from which to retrieve reference samples of reference pictures (e.g., stored in DPB 218) for performing DMVD for a current block of video data. The deterministic bounding box may be the same size for any of the various DMVD techniques, e.g., each of template matching (TM), bilateral merge (BM), decoder-side motion vector refinement (DMVR), and/or multi-pass DMVR.

To determine the deterministic bounding box, motion compensation unit 224 may initially retrieve an unrefined motion vector from a neighboring block to the current block. The unrefined motion vector may be a motion vector that was encoded (and stored) for the neighboring block using data in the bitstream, without having been refined using any of the various DMVD techniques. Thus, motion compensation unit 224 may refine the motion vector for the neighboring block prior to encoding the neighboring block, but may use the unrefined version of the motion vector for the neighboring block to determine the deterministic bounding box for the current block.

Using the unrefined motion vector for the neighboring block, motion compensation unit 224 may identify a center sample of the deterministic bounding box in a reference picture. If the center sample is at position (x, y) in the reference picture, the deterministic bounding box may have vertices of (x−N, y−N), (x−N, y+N), (x+N, y−N), and (x+N, y+N), where N is a positive integer value. N may be a preconfigured value, a value calculated according to a multiple of an internal motion vector storage precision, or a value video encoder 200 signals in the bitstream (e.g., in a sequence parameter set (SPS), picture parameter set (PPS), slice header information, block header information, or the like). Again, N may be the same for each of the various DMVD techniques.

Motion compensation unit 224 may then perform any of the various DMVD techniques of this disclosure (or other DMVD-like techniques), performing a refinement search within the deterministic bounding box. Motion compensation unit 224 may perform a motion field reconstruction stage using one or more unrefined motion vectors of previously coded blocks to the current block, then perform a reference sample fetching stage using the one or more unrefined motion vectors to retrieve reference samples within the deterministic bounding box. Motion compensation unit 224 may then perform the DMVD techniques using the retrieved reference samples.

In some examples, when motion compensation unit 224 performs TM, motion compensation unit 224 may use only neighboring reconstruction samples to form a current block template.

Ultimately, after deriving or refining one or more motion vectors using one or more DMVD techniques of this disclosure, motion compensation unit 224 may obtain reference samples to generate a prediction block using the motion vectors. Formation of the prediction block may be performed during a motion compensation stage. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a video encoder including a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Figure 10:
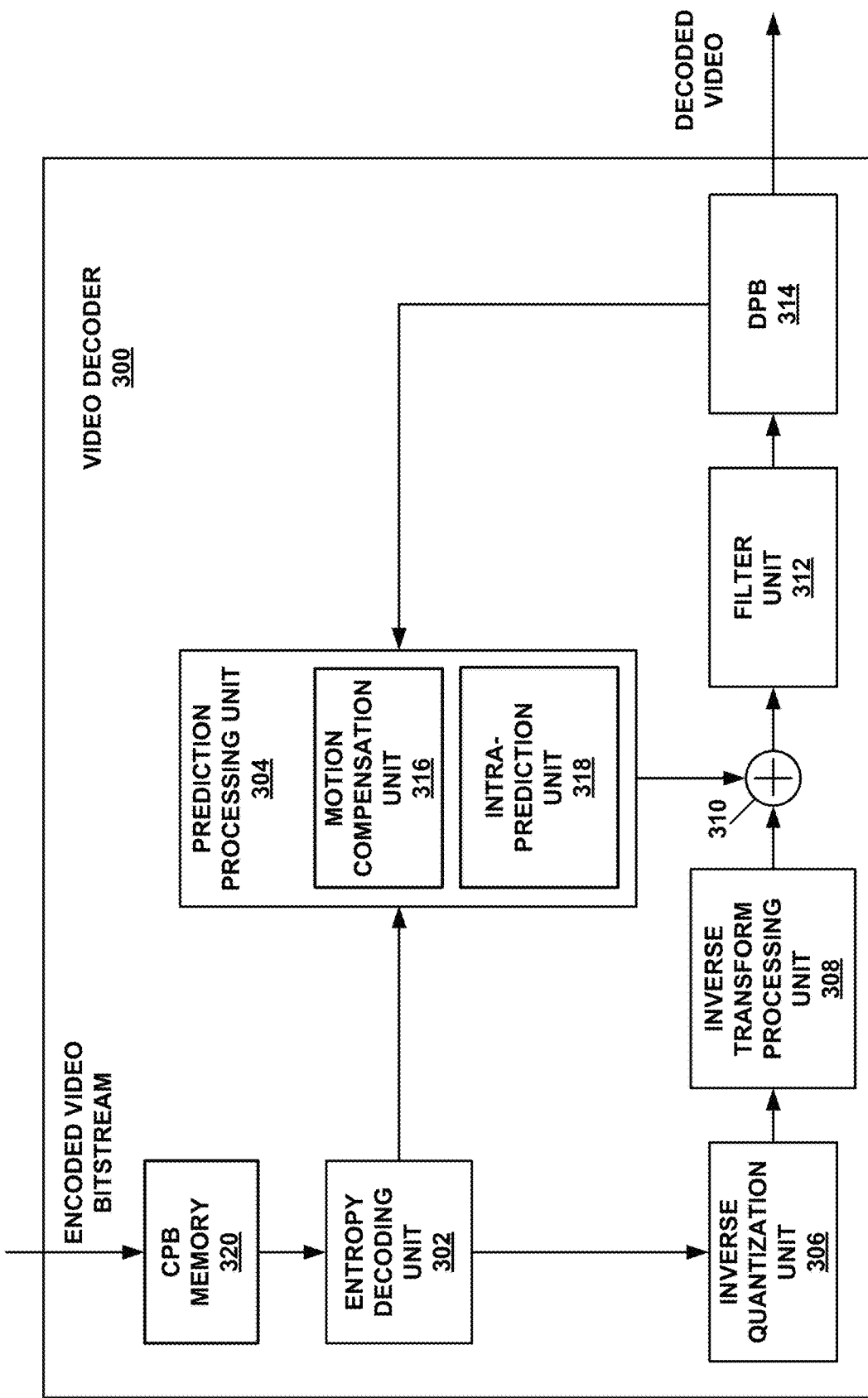
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

In accordance with techniques of this disclosure, motion compensation unit 316 may determine a deterministic bounding box from which to retrieve reference samples of reference pictures (e.g., stored in DPB 314) for performing DMVD for a current block of video data. The deterministic bounding box may be the same size for any of the various DMVD techniques, e.g., each of template matching (TM), bilateral merge (BM), decoder-side motion vector refinement (DMVR), and/or multi-pass DMVR.

To determine the deterministic bounding box, motion compensation unit 316 may initially retrieve an unrefined motion vector from a neighboring block to the current block. The unrefined motion vector may be a motion vector that was encoded (and stored) for the neighboring block using data in the bitstream, without having been refined using any of the various DMVD techniques. Thus, motion compensation unit 316 may refine the motion vector for the neighboring block prior to encoding the neighboring block, but may use the unrefined version of the motion vector for the neighboring block to determine the deterministic bounding box for the current block.

Using the unrefined motion vector for the neighboring block, motion compensation unit 316 may identify a center sample of the deterministic bounding box in a reference picture. If the center sample is at position (x, y) in the reference picture, the deterministic bounding box may have vertices of (x−N, y−N), (x−N, y+N), (x+N, y−N), and (x+N, y+N), where N is a positive integer value. N may be a preconfigured value, a value calculated according to a multiple of an internal motion vector storage precision, or a value video encoder 200 signals in the bitstream (e.g., in a sequence parameter set (SPS), picture parameter set (PPS), slice header information, block header information, or the like). Again, N may be the same for each of the various DMVD techniques.

Motion compensation unit 316 may then perform any of the various DMVD techniques of this disclosure (or other DMVD-like techniques), performing a refinement search within the deterministic bounding box. Motion compensation unit 316 may perform a motion field reconstruction stage using one or more unrefined motion vectors of previously coded blocks to the current block, then perform a reference sample fetching stage using the one or more unrefined motion vectors to retrieve reference samples within the deterministic bounding box. Motion compensation unit 316 may then perform the DMVD techniques using the retrieved reference samples.

In some examples, when motion compensation unit 316 performs TM, motion compensation unit 316 may use only neighboring reconstruction samples to form a current block template.

Ultimately, after deriving or refining one or more motion vectors using one or more DMVD techniques of this disclosure, motion compensation unit 316 may obtain reference samples to generate a prediction block using the motion vectors. Formation of the prediction block may be performed during a motion compensation stage. For example, motion compensation unit 316 may retrieve data of the reference block using the motion vector. As another example, if the motion vector has fractional sample precision, motion compensation unit 316 may interpolate values for the prediction block according to one or more interpolation filters. Moreover, for bi-directional inter-prediction, motion compensation unit 316 may retrieve data for two reference blocks identified by respective motion vectors and combine the retrieved data, e.g., through sample-by-sample averaging or weighted averaging.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314.

As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoder including a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Figure 11:
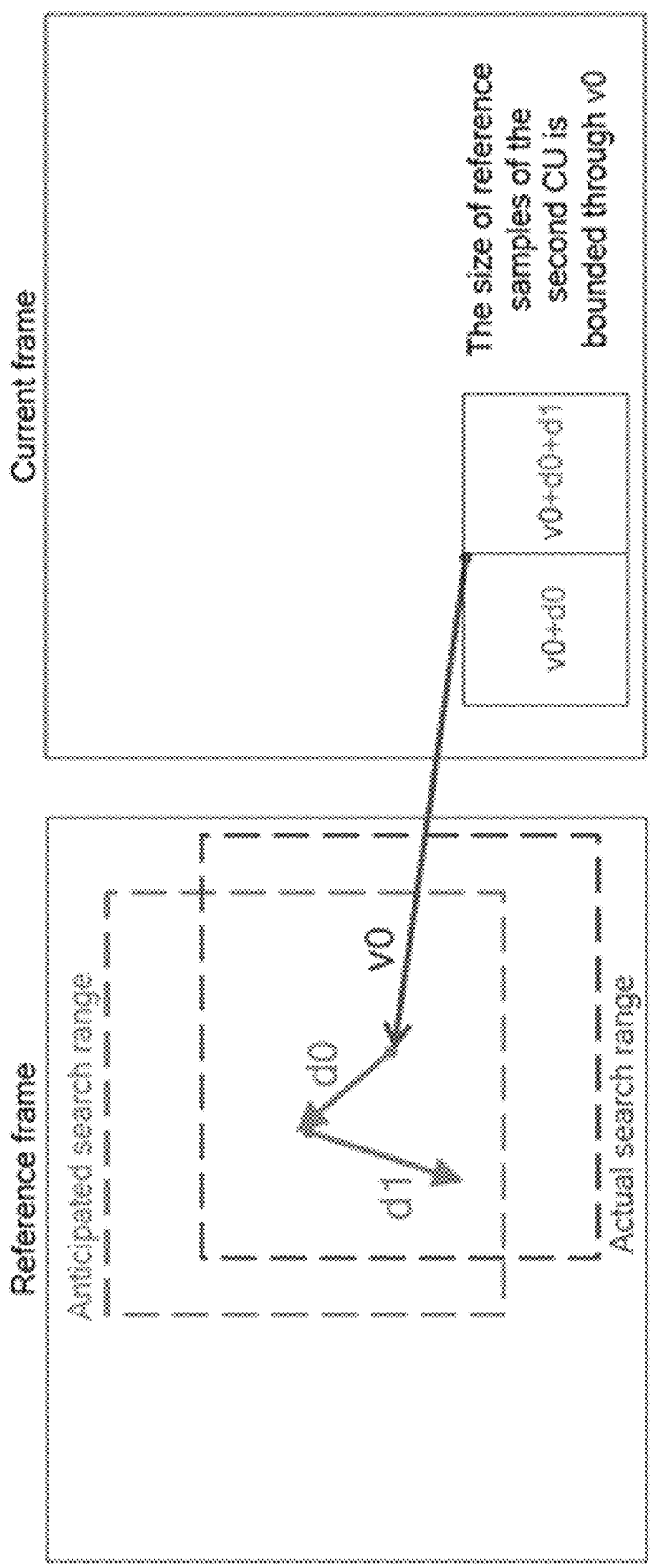
FIG. 11 is a conceptual diagram illustrating an example merge with motion vector difference (MMVD) search point.

FIG. 11 is a conceptual diagram illustrating an example merge with motion vector difference (MMVD) search point. Certain techniques of this disclosure, which may be performed by video encoder 200 and video decoder 300 above, are described with respect to FIG. 11. In particular, a bounding box may be represented as a function of at least the following three aspects:

the unrefined MV (i.e., v0 in FIG. 11) inferred from a causal neighboring block that carries no refinement vector information self-derived by DMVD methods or inferred;

the search range size (denoted as SR which specifies that a given DMVD method can search toward each direction centered at a given initial search point within a N-pixel range at most, where N is predefined by using $2^{-4}, 2^{-3}, 2^{-2}, 2^{-1}, 1, 2, 3, 4, 5, 6, 7, 8, \ldots$ times internal MV storage precision (e.g., 4 in HEVC, 16 in VVC) or signalled per picture/subpicture/slice/tile) of DMVD method used in the current block (i.e., the second block in current frame depicted in FIG. 11);

interpolation filter lengths (denoted as L).

Without loss of simplicity, FIG. 11 serves as an example to describe the constrained search range. It is assumed that there is a first block in the current frame for which a video coder (video encoder 200 or video decoder 300) infers a MV (i.e., v0) from its neighboring block and self-derive its refinement vector information (i.e., d0) through a DMVD method. Further, the video coder infers, for a second block (which is the current block) motion information from the first block and derives refinement vector information (i.e., d1) through a DMVD method. The video coder may perform the final motion compensation according to v0+d0 and v0+d0+d1 respectively for the two blocks. If there is a third block for which the video coder infers motion information from the second block, a final MV can be represented as $v0+(\Sigma i \in \{0,1\} di)+d2$. These d0, d1, d2, . . . terms are used only for motion compensation and are not necessarily used for determining the search range.

Unlike conventional DMVD, which is premised upon a video coder determining that a final neighboring block (e.g., v0+d0) is the center to form an anticipated search range (i.e., [v0+d0−(SR, SR), v0+d0+(SR, SR)] shown in FIG. 11), this example does not propagate the refined motion vectors to the next blocks. Instead, the video coder determines its actual search range based solely on the unrefined version (i.e., v0) of inferred neighboring block motion. Therefore, the actual search range can be represented by [v0−(SR, SR), v0+(SR, SR)]. Since none of the refinement vector information is carried over from neighboring blocks, the reference samples to be fetched for the current block become deterministic, which is of size (W+L+2SR)×(H+L+2SR), where W and H are width and height of the current block, respectively. In this manner, the search range center may be identified by an unrefined motion vector of a neighboring block.

The following examples describe various extensions to the constrained search range, which may be used alone or in various combinations:

In some examples, video encoder 200 and video decoder 300 may perform DMVD to start from any MV within the actual search range, and limit the MV refinement to the actual search range. For example, video encoder 200 and video decoder 300 may start from where v0+d0 points to within the actual search range.

In some examples, video encoder 200 and video decoder 300 may perform DMVD starting from where v0 points to within the actual search range.

In some examples, video encoder 200 and video decoder 300 may further clip the search range size to the overlapped area between the anticipated search range and the actual search range.

In some examples, video encoder 200 and video decoder 300 may perform DMVD with a full search pattern within the actual search range or the overlapped area between the anticipated search range and the actual search range.

In some examples, video encoder 200 and video decoder 300 may fetch a number of reference samples less than (W+L+2SR)×(H+L+2SR), such as (W+L'+2SR)×(H+L'+2SR) where L'∈ [0, 1, 2, . . . , L], and perform the same padding method as frame-level reference sample padding does to extend the size of (W+L'+2SR)×(H+L'+2SR) to be (W+L+2SR)×(H+L+2SR).

In some examples, video encoder 200 and video decoder 300 may further be configured to implement a more restrictive constraint on BM, DMVR, and multi-pass DMVR for each of the derived refinement motion information to be within their respective actual search range. Since they are featured with symmetric refinement vectors between two reference pictures in bi-prediction case, the accessible area may sometimes be more restricted than the actual search range. For example, these DMVD methods cannot search toward the right direction for L1 MV if the inferred unrefined MV of L0 already reaches the left boundary of its actual search range (and thus it cannot search toward its left direction). That is, because the search may not start at the center of the search area, a search may proceed from a point identified by one motion vector toward one side of the search area and another search may proceed from a different point identified by a different motion vector toward the other side of the search area. This may avoid certain boundary search points. Additionally or alternatively, the video coder may perform motion vector clipping for a motion vector that crosses the search area boundary (deterministic bounding box).

In another example, the feature of symmetric refinement vectors can be relaxed by MV clipping when one of the inferred unrefined MV hits a boundary of its actual search range, while the others are not. For example, these DMVD methods can search toward the right direction for L1 MV even if the inferred unrefined MV of L0 already reaches the left boundary of its actual search range, because the MV or L0 derived during the search process is always clipped to the nearest available position before DMVD matching cost is computed.

In some examples, video encoder 200 and video decoder 300 may clip the derived refinement vector information of the two-pass BDOF (a sub-process of multi-pass DMVR described in U.S. Provisional Application No. 63/129,221, filed Dec. 22, 2020), when out-of-range condition (that is the final motion compensation would go beyond the actual search range) occurs on either one of the reference picture.

In some examples, video encoder 200 and video decoder 300 may reset the derived refinement vector information of the two-pass BDOF to be zero vectors.

In some examples, video encoder 200 and video decoder 300 may clip the derived refinement vector information independently for each reference pictures.

In some examples, video encoder 200 and video decoder 300 may find a minimum value (rn), shared across reference pictures, to be added on top of the derived refinement vector information of a reference picture and subtracted from that of the other reference picture to ensure the out-of-range condition does not occur on both reference pictures. This may ensure that a motion vector difference (delta) that is found using BDOF may remain symmetric for both reference blocks. Suppose, for example, that a motion vector points to an out-of-bounds area, and "vector m" is the minimal delta vector that the motion vector needs to point back into the search area. The out of bounds motion vector plus vector m can ensure that the out-of-bound condition does not happen, and vector m may then be fed to the other motion vector to ensure symmetry.

In some examples, video encoder 200 and video decoder 300 may align the search range over all DMVD methods. Since only one SR is used, video encoder 200 and video decoder 300 do not need to identify the DMVD method used for certain blocks before computing the size of reference samples to be fetched from reference pictures.

In some examples, video encoder 200 and video decoder 300 may unify the search range of all DMVD methods cascading in multi-pass DMVR to be within [v0−(SR, SR), v0+(SR, SR)], so that video encoder 200 and video decoder 300 do not need to identify which DMVR method is used. Multi-pass DMVR generally uses a larger search range before computing the size of reference samples to be fetched from reference pictures.

In some examples, video encoder 200 and video decoder 300 may further be configured with a restriction on the self-derived refinement vector information (e.g., d1) that avoids no refinement condition from happening when the DMVD method is TM. In the other words, the input MVs to TM cannot be identical to the output MVs. Another example imposes the restriction only when TM performs search for a uni-prediction block.

In the various DMVD methods (e.g., TM, BM, DMVR, and multi-pass DMVR), the video coder derives refinement vector information at the motion compensation stage. Thus, the refinement vector information is an unknown term during motion field reconstruction and reference sample fetching stages. This is the key point behind the techniques discussed above to limit the search range to be [v0−(SR, SR), v0+(SR, SR)]. Thus, no matter how $\Sigma_i d_i$ accumulates across spatial blocks, the actual search range is always bounded.

Additionally or alternatively, video encoder 200 and video decoder 300 may be configured with a constraint on spatial motion vector prediction to avoid using refinement vector information to reconstruct a motion field of coded blocks. In this example, unrefined MVs may be propagated to subsequent blocks for spatial motion vector prediction during motion field reconstruction stage and reference sample fetching stage, while refined MVs (i.e., the unrefined MVs plus inferred refinement vector information such as d0 of the second block in FIG. 11 from the same neighboring block(s) and self-derived refinement vector information, such as d1 when performed) are carried over to subsequent blocks only in motion compensation stage. Thus, the unrefined motion vector may be used both for motion vector propagation and for motion vector inference. A neighboring refined motion vector may be inferable during a motion compensation stage, such that sequential motion compensation may be performed across blocks/CUs.

Since the refinement vector information in unknown before motion compensation stage, video encoder 200 and video decoder 300 may have to fetch more reference sample according to the configuration of SR and L' introduced above. Therefore, during reference sample fetching stage, no matter the current block carries refinement vector information inferred from its neighboring blocks, derived by itself or a combination of both, the maximum number of fetched reference samples are bounded to (W+L'+2SRmax)×(H+L'+2SRmax), where the SRmax is the maximum one of all supported DMVR methods in a codec. The same amount of reference samples may be retrieved as in DMVD were to be performed for the block.

These techniques may be applied to extend the constrained search range, as follows:

In some examples, video encoder 200 and video decoder 300 may construct AMVP and merge candidate lists based on the unrefined MVs from neighboring blocks. Therefore, the unrefined MVs may be used to perform the pruning process and to reconstruct the motion field of the current picture.

In some examples, video encoder 200 and video decoder 300 may use only unrefined MVs to generate the constructed candidates of Affine AMVP, Affine merge, and Affine MMVD merge modes. The refinement vector information is used neither in motion vector reconstruction stage, reference fetching stage (i.e., independent of L' and $SR_{max}$) and motion compensation stage.

In some examples, video encoder 200 and video decoder 300 may use only unrefined MVs to be its motion source vector (i.e., the left spatial candidate motion) of subblock TMVP mode.

In some examples, video encoder 200 and video decoder 300 may allow other inter prediction modes (e.g., MMVD, CIIP, OBMC, multi-hypothesis prediction) to use refined MVs inferred from neighboring blocks during motion compensation stage. Another example allows some inter prediction modes (e.g., MMVD, CIIP, OBMC, multi-hypothesis prediction) to use unrefined MVs inferred from neighboring blocks during motion compensation stage.

In some examples, video encoder 200 and video decoder 300 may store only refined MVs for subsequent frame to perform temporal motion vector prediction.

In another example, video encoder 200 and video decoder 300 may store only unrefined MVs for subsequent frame to perform temporal MV prediction.

In both examples, video encoder 200 and video decoder 300 may apply these techniques to deblocking filtering to compute boundary strength.

Additionally or alternatively, video encoder 200 and video decoder 300 may be configured with a constraint on accessing neighboring reconstruction samples for a current block template generation. Video encoder 200 and video decoder 300 may be prevented from accessing neighboring reconstruction samples to form a current block template for template matching. Instead, video encoder 200 and video decoder 300 may be configured with any of the following various replacement techniques:

In some examples, video encoder 200 and video decoder 300 may use the refined MVs inferred from neighboring blocks to the current block to generate a prediction block (that is collocated with the current block templates) to replace current block templates. The interpolation filters that are used respectively to generate the prediction-based current block template and search area samples need not always be the same. Thus, video encoder 200 and video decoder 300 may generate the current block template using the inferred refined motion vector from the merge candidate list.

In some examples, video encoder 200 and video decoder 300 may access all neighboring blocks and uses their motion information (that were used in motion compensation stage) to generate a prediction block to replace the current block templates. Unlike the previous example, this example forms the prediction block with multiple patches because causal neighboring blocks surrounding the current block usually have different motion. That is, in this example, all of the motion vectors of the neighboring blocks may be used directly if they are within the area of the current block template. Sometimes, neighboring blocks may be intra-coded (or coded by some other pre-defined set of prediction modes). This exception case may be handled in the following techniques.

In some examples, video encoder 200 and video decoder 300 may discard these intra blocks and not count the discarded intra blocks in the computation process of template matching cost.

In some examples, video encoder 200 and video decoder 300 may fill MVs for these neighboring intra blocks by padding through nearest available MVs.

In some examples, video encoder 200 and video decoder 300 may fill MVs for these neighboring intra blocks by performing bilinear interpolation based on two nearest available MVs.

In some examples, video encoder 200 and video decoder 300 may bypass the refinement process of TM when there are too many intra-coded blocks in the immediately causal neighboring area of the current block. A ratio is pre-defined, such as if one, two or three quarters of samples of the entire current block templates are collocated with intra-coded blocks, then TM is bypassed.

In some examples, video encoder 200 and video decoder 300 may disable the use of either one of above and left template blocks. If a template block is collocated with a certain amount of intra-coded sample over a pre-defined ratio, then this template block is disabled and is not used in TM.

In some examples, video encoder 200 and video decoder 300 may perform template matching based solely on either one of the above and left template blocks if the refined MVs inferred from spatial neighboring blocks. When the inferred spatial neighboring block is from the above (or above-right) relative to the current block, only above template may be used in template matching.

When the inferred spatial neighboring block is from the left (or bottom-left) relative to the current block, only left template may be used in template matching.

In some examples, video encoder 200 and video decoder 300 may add partial residual reconstruction information into the current block templates as an approximation to the actual ones, as follows:

In some examples, video encoder 200 and video decoder 300 may add a reconstructed DC value of each neighboring transform units (TUs) on top of the collocated patches of the current block template.

In some examples, video encoder 200 and video decoder 300 may, when DCT is not used according to MTS mode selection for a neighboring TU, nothing is added on top of the collocated patches of the current block template.

In some examples, video encoder 200 and video decoder 300 may, when LFNST is used, perform the LFNST to compute quantized coefficients and the DC coefficient, which may be reconstructed and added on top of the collocated patches of the current block template.

In some examples, video encoder 200 and video decoder 300 may, when LFNST is used, use the first coefficient of LFNST as if the first coefficient were the actual quantized DC coefficient, and then this LFNST coefficient may be inversely transform-quantized to get an estimate of DC value which is then added on top of the collocated patches of the current block template.

In some examples, video encoder 200 and video decoder 300 may, no matter LMCS is enabled or not, add the reconstructed or estimated DC value directly on top of the collocated patches of the current block template.

In some examples, video encoder 200 and video decoder 300 may, when LMCS is enabled, not add the reconstructed or estimated DC value on top of the collocated patches of the current block template. On the contrary, the collocated patch is converted through forward LMCS conversion, added with the reconstructed or estimated DC value, and then converted back through inverse LMCS conversion.

In some examples, video encoder 200 and video decoder 300 may be configured to avoid using neighboring samples using certain modes for their coding in the template. Such samples can be treated as unavailable. In other words, only the neighboring samples using the prediction modes which are allowed can be utilized in the template. The unavailable samples can be replaced with available samples. In another example, if there is any unavailable sample in the template, the template matching refinement is not applied.

Figure 12:
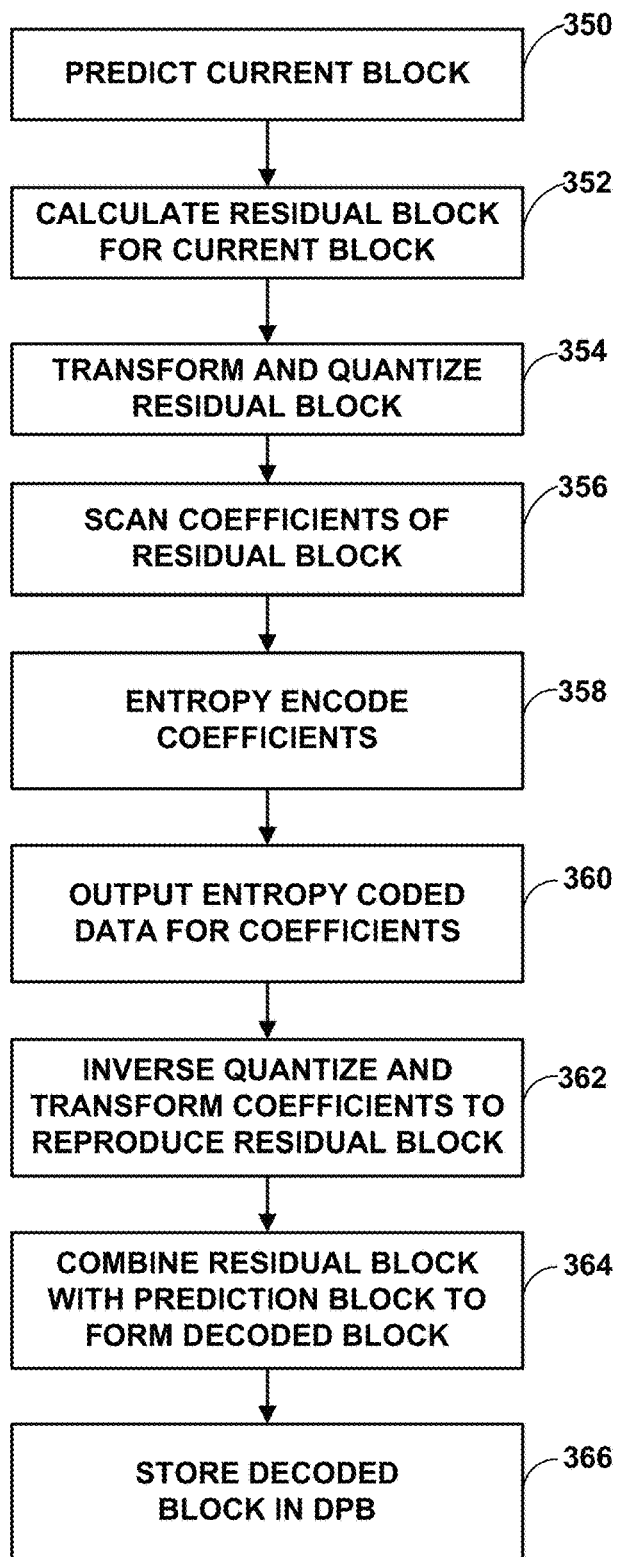
FIG. 12 is a flowchart illustrating an example method for encoding a current block in accordance with the techniques of this disclosure.

The disallowed prediction modes may include the modes that use any sort of propagation or require sequential block processing, for example:
Intra prediction
Intra block copy prediction
Decode side derived methods, such as template matching or similar Illumination compensation methods FIG. 12 is a flowchart illustrating an example method for encoding a current block in accordance with the techniques of this disclosure. The current block may comprise a current CU. Although described with respect to video encoder 200 (FIGS. 1 and 9), it should be understood that other devices may be configured to perform a method similar to that of FIG. 12.

In this example, video encoder 200 initially predicts the current block (350). For example, video encoder 200 may form a prediction block for the current block. In particular, video encoder 200 may perform inter-prediction to predict the block, including performing decoder-side motion vector derivation (DMVD) according to any of the various techniques of this disclosure, alone or in any combination, to form a motion vector for the current block. Video encoder 200 may then form a prediction block using the motion vector. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 13:
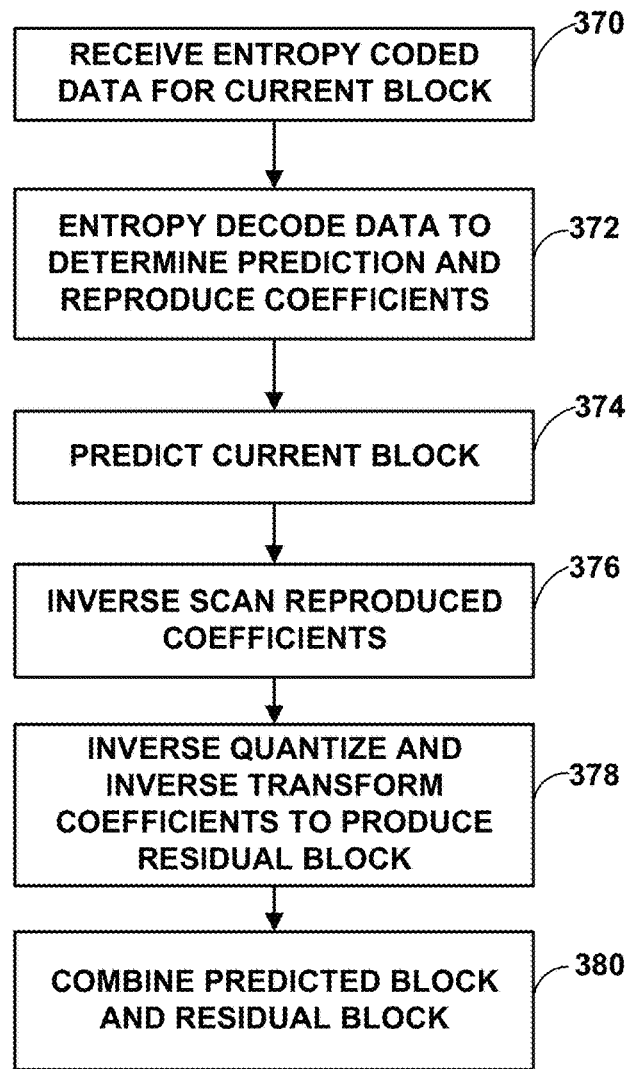
FIG. 13 is a flowchart illustrating an example method for decoding a current block in accordance with the techniques of this disclosure.

FIG. 13 is a flowchart illustrating an example method for decoding a current block of video data in accordance with the techniques of this disclosure. The current block may comprise a current CU. Although described with respect to video decoder 300 (FIGS. 1 and 10), it should be understood that other devices may be configured to perform a method similar to that of FIG. 13.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an inter-prediction mode as indicated by the prediction information for the current block, to calculate a prediction block for the current block. In particular, video decoder 300 may perform inter-prediction to predict the block, including performing decoder-side motion vector derivation (DMVD) according to any of the various techniques of this disclosure, alone or in any combination, to form a motion vector for the current block. Video decoder 300 may then form a prediction block using the motion vector. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 14:
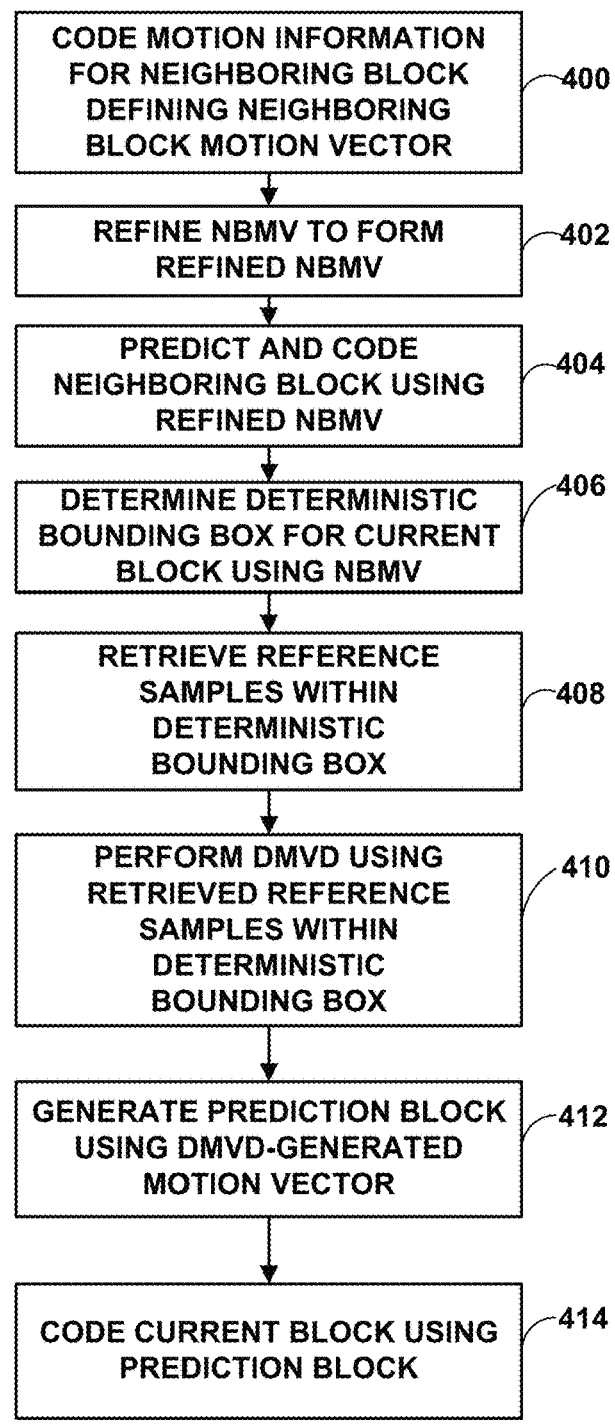
FIG. 14 is a flowchart illustrating an example method for coding a current block using a motion vector derived and/or refined according to techniques of this disclosure.

FIG. 14 is a flowchart illustrating an example method for coding a current block using a motion vector derived and/or refined according to techniques of this disclosure. The method of FIG. 14 may be performed by video encoder 200 (e.g., during step 350 of the method of FIG. 12) or by video decoder 300 (e.g., during step 374 of the method of FIG. 13). For purposes of example, the method of FIG. 14 is explained with respect to video decoder 300, although certain examples are also explained with respect to video encoder 200.

Initially, video decoder 300 may code (decode) motion information for a neighboring block defining a neighboring block motion vector (NBMV) (400). For example, video decoder 300 may decode a merge index or AMVP motion information. Video decoder 300 may then use the decoded motion information to form an unrefined motion vector as the NBMV for the neighboring block. Video decoder 300 may store the unrefined motion vector with the neighboring block as the unrefined NBMV. Furthermore, video decoder 300 may refine the NBMV (e.g., using any of the various DMVD techniques of this disclosure) to form a refined NBMV (402) and predict and code the neighboring block using the refined NBMV (404). When performed by video encoder 200, video encoder 200 may encode the motion information.

Video decoder 300 may then retrieve the unrefined NBMV stored with the neighboring block and determine a deterministic boundary box for the current block using the unrefined NBMV (406). That is, the unrefined NBMV may point to a center sample of the deterministic bounding box. Video decoder 300 may further determine that the deterministic boundary box extends N samples above, below, to the left, and to the right of the center sample, where N may be a positive integer value that is the same for any of the various DMVD techniques.

Video decoder 300 may further retrieve reference samples within the deterministic bounding box (408) from a reference picture. Video decoder 300 may also perform DMVD using the retrieved reference samples with the deterministic bounding box (410) to form a DMVD-generated motion vector for the current block. Video decoder 300 may then generate a prediction block using the DMVD-generated motion vector (412). Video decoder 300 may then code (decode) the current block using the prediction block (414). For example, video decoder 300 may decode quantized transform coefficients from the bitstream, inverse quantize and inverse transform the quantized transform coefficients to form a residual block, then combine samples of the prediction block with co-located samples of the residual block to ultimately decode (reconstruct) the current block. Video encoder 200 may both encode and decode/reconstruct the current block using the prediction block, e.g., by calculating a residual block as sample-by-sample differences between the current block and the prediction block, transform and quantize the residual block, and encode the resulting quantized transform coefficients of the residual block. Video encoder 200 may decode the block in a manner substantially similar to that discussed with respect to video decoder 300 above.

In this manner, the method of FIG. 3 represents an example of a method of coding (e.g., encoding or decoding) a block of video data including determining a deterministic bounding box from which to retrieve reference samples of reference pictures of video data for performing decoder-side motion vector derivation (DMVD) for a current block of the video data; deriving a motion vector for the current block according to DMVD using the reference samples within the deterministic bounding box; forming a prediction block using the motion vector; and decoding the current block using the prediction block.d Certain techniques of this disclosure are summarized in the following clauses:

Clause 1: A method of decoding video data, the method comprising: determining a deterministic bounding box from which to retrieve reference samples of reference pictures of video data for performing decoder-side motion vector derivation (DMVD) for a current block of the video data; deriving a motion vector for the current block according to DMVD using the reference samples within the deterministic bounding box; forming a prediction block using the motion vector; and decoding the current block using the prediction block.

Clause 2: The method of clause 1, wherein deriving the motion vector comprises: inferring an unrefined motion vector from a neighboring block to the current block; and refining the unrefined motion vector to form the motion vector for the current block.

Clause 3: The method of any of clauses 1 and 2, wherein determining the deterministic bounding box comprises: inferring an unrefined motion vector for the current block from a neighboring block to the current block; and determining the deterministic bounding box as having an area including samples within N samples of a sample indicated by the unrefined motion vector.

Clause 4: The method of clause 3, wherein N is a predefined value determined according to a multiple of an internal motion vector storage precision.

Clause 5: The method of any of clauses 1-4, wherein determining the deterministic bounding box comprises determining the deterministic bounding box according to an interpolation filter length for DMVD.

Clause 6: The method of any of clauses 1-5, wherein deriving the motion vector comprises performing a motion search starting within the deterministic bounding box.

Clause 7: The method of any of clauses 1-6, wherein DMVD comprises one of template matching (TM), bilateral merge (BM), decoder-side motion vector refinement (DMVR), or multi-pass DMVR.

Clause 8: A method of decoding video data, the method comprising: deriving a motion vector for a current block of video data according to decoder-side motion vector derivation (DVMD), including: performing a motion field reconstruction stage using one or more unrefined motion vectors of previously coded blocks to the current block; and performing a reference sample fetching stage using the one or more unrefined motion vectors of the previously coded blocks; performing a motion compensation stage for the current block using one or more refined motion vectors of the previously coded blocks to generate a prediction block for the current block; and decoding the current block using the prediction block.

Clause 9: A method comprising a combination of the method of any of clauses 1-7 and the method of clause 8.

Clause 10: The method of any of clauses 8 and 9, further comprising generating a motion vector candidate list for the current block using the one or more unrefined motion vectors of the previously coded blocks.

Clause 11: A method of decoding video data, the method comprising: deriving a motion vector for a current block of video data according to template matching (TM) for decoder-side motion vector derivation (DVMD), including using only neighboring reconstruction samples to form a current block template for TM; generating a prediction block for the current block using the motion vector; and decoding the current block using the prediction block.

Clause 12: A method comprising a combination of the method of any of clauses 1-10 and the method of clause 11.

Clause 13: The method of any of clauses 1-12, further comprising encoding the current block prior to decoding the current block.

Clause 14: A device for decoding video data, the device comprising one or more means for performing the method of any of clauses 1-13.

Clause 15: The device of clause 14, wherein the one or more means comprise one or more processors implemented in circuitry.

Clause 16: The device of any of clauses 14 and 15, further comprising a display configured to display the decoded video data.

Clause 17: The device of any of clauses 14-16, wherein the device comprises one or more of a camera, a computer, a mobile device, a broadcast receiver device, or a set-top box.

Clause 18: The device of clause 14-17, further comprising a memory configured to store the video data.

Clause 19: A computer-readable storage medium having stored thereon instructions that, when executed, cause a processor of a device for decoding video data to perform the method of any of clauses 1-13.

Clause 20: A device for decoding video data, the device comprising: means for determining a deterministic bounding box from which to retrieve reference samples of reference pictures of video data for performing decoder-side motion vector derivation (DVMD) for a current block of the video data; means for deriving a motion vector for the current block according to DVMD using the reference samples within the deterministic bounding box; means for forming a prediction block using the motion vector; and decoding the current block using the prediction block.

Clause 21: A device for decoding video data, the device comprising: means for deriving a motion vector for a current block of video data according to decoder-side motion vector derivation (DVMD), including: means for performing a motion field reconstruction stage using one or more unrefined motion vectors of previously coded blocks to the current block; and means for performing a reference sample fetching stage using the one or more unrefined motion vectors of the previously coded blocks; means for performing a motion compensation stage for the current block using one or more refined motion vectors of the previously coded blocks to generate a prediction block for the current block; and means for decoding the current block using the prediction block.

Clause 22: A device for decoding video data, the device comprising: means for deriving a motion vector for a current block of video data according to template matching (TM) for decoder-side motion vector derivation (DVMD), including using only neighboring reconstruction samples to form a current block template for TM; means for generating a prediction block for the current block using the motion vector; and means for decoding the current block using the prediction block.

Clause 23: A method of decoding video data, the method comprising: determining a deterministic bounding box from which to retrieve reference samples of reference pictures of video data for performing decoder-side motion vector derivation (DMVD) for a current block of the video data; deriving a motion vector for the current block according to DMVD using the reference samples within the deterministic bounding box; forming a prediction block using the motion vector; and decoding the current block using the prediction block.

Clause 24: The method of clause 23, wherein deriving the motion vector comprises: retrieving an unrefined motion vector from a neighboring block to the current block; and refining the unrefined motion vector to form the motion vector for the current block.

Clause 25: The method of clause 23, wherein determining the deterministic bounding box comprises: decoding motion information for a neighboring block to the current block, the motion information including data defining a neighboring block motion vector; and using the neighboring block motion vector to determine the deterministic bounding block.

Clause 26: The method of clause 25, further comprising: refining the neighboring block motion vector to form a refined neighboring block motion vector; and predicting the neighboring block using the refined neighboring block motion vector.

Clause 27: The method of clause 25, wherein determining the deterministic bounding box comprises determining the deterministic bounding box as having an area including samples within N samples of a sample indicated by the neighboring block motion vector.

Clause 28: The method of clause 27, wherein N is a predefined value determined according to a multiple of an internal motion vector storage precision.

Clause 29: The method of clause 27, wherein N is the same for each of template matching (TM), bilateral merge (BM), decoder-side motion vector refinement (DMVR), or multi-pass DMVR.

Clause 30: The method of clause 23, wherein determining the deterministic bounding box comprises determining the deterministic bounding box according to an interpolation filter length for DMVD.

Clause 31: The method of clause 23, wherein deriving the motion vector comprises performing a motion search starting within the deterministic bounding box.

Clause 32: The method of clause 23, wherein DMVD comprises one of template matching (TM), bilateral merge (BM), decoder-side motion vector refinement (DMVR), or multi-pass DMVR.

Clause 33: The method of clause 23, wherein deriving the motion vector comprises: performing a motion field reconstruction stage using one or more unrefined motion vectors of previously coded blocks to the current block; and performing a reference sample fetching stage using the one or more unrefined motion vectors of the previously coded blocks, and wherein forming the prediction block comprises performing a motion compensation stage for the current block using one or more refined motion vectors of the previously coded blocks to generate the prediction block for the current block.

Clause 34: The method of clause 33, further comprising generating a motion vector candidate list for the current block using the one or more unrefined motion vectors of the previously coded blocks.

Clause 35: The method of clause 23, wherein deriving the motion vector for the current block according to DMVD comprises deriving the motion vector for the current block according to template matching (TM), including using only neighboring reconstruction samples to form a current block template for TM.

Clause 36: The method of clause 23, further comprising encoding the current block prior to decoding the current block.

Clause 37: A device for decoding video data, the device comprising: a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Clause 38: The device of clause 37, wherein to derive the motion vector, the one or more processors are configured to: retrieve an unrefined motion vector from a neighboring block to the current block; and refine the unrefined motion vector to form the motion vector for the current block.

Clause 39: The device of clause 37, wherein to determine the deterministic bounding box, the one or more processors are configured to: decode motion information for a neighboring block to the current block, the motion information including data defining a neighboring block motion vector; and use the neighboring block motion vector to determine the deterministic bounding block.

Clause 40: The device of clause 39, wherein the one or more processors are further configured to: refine the neighboring block motion vector to form a refined neighboring block motion vector; and predict the neighboring block using the refined neighboring block motion vector.

Clause 41: The device of clause 39, wherein the one or more processors are configured to determine the deterministic bounding box as having an area including samples within N samples of a sample indicated by the neighboring block motion vector.

Clause 42: The device of clause 41, wherein N is a predefined value determined according to a multiple of an internal motion vector storage precision.

Clause 43: The device of clause 41, wherein N is the same for each of template matching (TM), bilateral merge (BM), decoder-side motion vector refinement (DMVR), or multi-pass DMVR.

Clause 44: The device of clause 37, wherein the one or more processors are configured to determine the deterministic bounding box according to an interpolation filter length for DMVD.

Clause 45: The device of clause 37, wherein to derive the motion vector, the one or more processors are configured to perform a motion search starting within the deterministic bounding box.

Clause 46: The device of clause 37, wherein DMVD comprises one of template matching (TM), bilateral merge (BM), decoder-side motion vector refinement (DMVR), or multi-pass DMVR.

Clause 47: The device of clause 37, wherein to derive the motion vector, the one or more processors are configured to: perform a motion field reconstruction stage using one or more unrefined motion vectors of previously coded blocks to the current block; and perform a reference sample fetching stage using the one or more unrefined motion vectors of the previously coded blocks, and wherein to form the prediction block, the one or more processors are configured to perform a motion compensation stage for the current block using one or more refined motion vectors of the previously coded blocks to generate the prediction block for the current block.

Clause 48: The device of clause 47, wherein the one or more processors are configured to generate a motion vector candidate list for the current block using the one or more unrefined motion vectors of the previously coded blocks.

Clause 49: The device of clause 37, wherein the one or more processors are configured to derive the motion vector for the current block according to template matching (TM), including using only neighboring reconstruction samples to form a current block template for TM.

Clause 50: The device of clause 37, wherein the one or more processors are further configured to encode the current block prior to decoding the current block.

Clause 51: The device of clause 37, further comprising a display configured to display the decoded video data.

Clause 52: The device of clause 37, wherein the device comprises one or more of a camera, a computer, a mobile device, a broadcast receiver device, or a set-top box.

Clause 53: A computer-readable storage medium having stored thereon instructions that, when executed, cause a processor to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Clause 54: The computer-readable storage medium of clause 53, wherein the instructions that cause the processor to derive the motion vector comprise instructions that cause the processor to: perform a motion field reconstruction stage using one or more unrefined motion vectors of previously coded blocks to the current block; and perform a reference sample fetching stage using the one or more unrefined motion vectors of the previously coded blocks, and wherein the instructions that cause the processor to form the prediction block comprise instructions that cause the processor to perform a motion compensation stage for the current block using one or more refined motion vectors of the previously coded blocks to generate the prediction block for the current block.

Clause 55: The computer-readable storage medium of clause 53, wherein the instructions that cause the processor to derive the motion vector for the current block according to DMVD comprise instructions that cause the processor to derive the motion vector for the current block according to template matching (TM), including using only neighboring reconstruction samples to form a current block template for TM.

Clause 56: A device for decoding video data, the device comprising: means for determining a deterministic bounding box from which to retrieve reference samples of reference pictures of video data for performing decoder-side motion vector derivation (DMVD) for a current block of the video data; means for deriving a motion vector for the current block according to DMVD using the reference samples within the deterministic bounding box; means for forming a prediction block using the motion vector; and decoding the current block using the prediction block.

Clause 57: The device of clause 56, wherein the means for deriving the motion vector comprises: means for performing a motion field reconstruction stage using one or more unrefined motion vectors of previously coded blocks to the current block; and means for performing a reference sample fetching stage using the one or more unrefined motion vectors of the previously coded blocks, and wherein the means for forming the prediction block comprises means for performing a motion compensation stage for the current block using one or more refined motion vectors of the previously coded blocks to generate the prediction block for the current block.

Clause 58: The device of clause 56, wherein the means for deriving the motion vector for the current block according to DMVD comprises means for deriving the motion vector for the current block according to template matching (TM), including using only neighboring reconstruction samples to form a current block template for TM.

Clause 59: A method of decoding video data, the method comprising: determining a deterministic bounding box from which to retrieve reference samples of reference pictures of video data for performing decoder-side motion vector derivation (DMVD) for a current block of the video data; deriving a motion vector for the current block according to DMVD using the reference samples within the deterministic bounding box; forming a prediction block using the motion vector; and decoding the current block using the prediction block.

Clause 60: The method of clause 59, wherein deriving the motion vector comprises: retrieving an unrefined motion vector from a neighboring block to the current block; and refining the unrefined motion vector to form the motion vector for the current block.

Clause 61: The method of any of clauses 59 and 60, wherein determining the deterministic bounding box comprises: decoding motion information for a neighboring block to the current block, the motion information including data defining a neighboring block motion vector; and using the neighboring block motion vector to determine the deterministic bounding block.

Clause 62: The method of clause 61, further comprising: refining the neighboring block motion vector to form a refined neighboring block motion vector; and predicting the neighboring block using the refined neighboring block motion vector.

Clause 63: The method of any of clauses 61 and 62, wherein determining the deterministic bounding box comprises determining the deterministic bounding box as having an area including samples within N samples of a sample indicated by the neighboring block motion vector.

Clause 64: The method of clause 63, wherein N is a predefined value determined according to a multiple of an internal motion vector storage precision.

Clause 65: The method of any of clauses 63 and 64, wherein N is the same for each of template matching (TM), bilateral merge (BM), decoder-side motion vector refinement (DMVR), or multi-pass DMVR.

Clause 66: The method of any of clauses 59-65, wherein determining the deterministic bounding box comprises determining the deterministic bounding box according to an interpolation filter length for DMVD.

Clause 67: The method of any of clauses 59-66, wherein deriving the motion vector comprises performing a motion search starting within the deterministic bounding box.

Clause 68: The method of any of clauses 59-67, wherein DMVD comprises one of template matching (TM), bilateral merge (BM), decoder-side motion vector refinement (DMVR), or multi-pass DMVR.

Clause 69: The method of any of clauses 59-68, wherein deriving the motion vector comprises: performing a motion field reconstruction stage using one or more unrefined motion vectors of previously coded blocks to the current block; and performing a reference sample fetching stage using the one or more unrefined motion vectors of the previously coded blocks, and wherein forming the prediction block comprises performing a motion compensation stage for the current block using one or more refined motion vectors of the previously coded blocks to generate the prediction block for the current block.

Clause 70: The method of clause 69, further comprising generating a motion vector candidate list for the current block using the one or more unrefined motion vectors of the previously coded blocks.

Clause 71: The method of any of clauses 59-70, wherein deriving the motion vector for the current block according to DMVD comprises deriving the motion vector for the current block according to template matching (TM), including using only neighboring reconstruction samples to form a current block template for TM.

Clause 72: The method of any of clauses 59-71, further comprising encoding the current block prior to decoding the current block.

Clause 73: A device for decoding video data, the device comprising: a memory configured to store video data; and one or more processors implemented in circuitry and configured to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Clause 74: The device of clause 73, wherein to derive the motion vector, the one or more processors are configured to: retrieve an unrefined motion vector from a neighboring block to the current block; and refine the unrefined motion vector to form the motion vector for the current block.

Clause 75: The device of any of clauses 73 and 74, wherein to determine the deterministic bounding box, the one or more processors are configured to: decode motion information for a neighboring block to the current block, the motion information including data defining a neighboring block motion vector; and use the neighboring block motion vector to determine the deterministic bounding block.

Clause 76: The device of clause 75, wherein the one or more processors are further configured to: refine the neighboring block motion vector to form a refined neighboring block motion vector; and predict the neighboring block using the refined neighboring block motion vector.

Clause 77: The device of any of clauses 75 and 76, wherein the one or more processors are configured to determine the deterministic bounding box as having an area including samples within N samples of a sample indicated by the neighboring block motion vector.

Clause 78: The device of clause 77, wherein N is a predefined value determined according to a multiple of an internal motion vector storage precision.

Clause 79: The device of any of clauses 77 and 78, wherein N is the same for each of template matching (TM), bilateral merge (BM), decoder-side motion vector refinement (DMVR), or multi-pass DMVR.

Clause 80: The device of any of clauses 73-79, wherein the one or more processors are configured to determine the deterministic bounding box according to an interpolation filter length for DMVD.

Clause 81: The device of any of clauses 73-80, wherein to derive the motion vector, the one or more processors are configured to perform a motion search starting within the deterministic bounding box.

Clause 82: The device of any of clauses 73-81, wherein DMVD comprises one of template matching (TM), bilateral merge (BM), decoder-side motion vector refinement (DMVR), or multi-pass DMVR.

Clause 83: The device of any of clauses 73-82, wherein to derive the motion vector, the one or more processors are configured to: perform a motion field reconstruction stage using one or more unrefined motion vectors of previously coded blocks to the current block; and perform a reference sample fetching stage using the one or more unrefined motion vectors of the previously coded blocks, and wherein to form the prediction block, the one or more processors are configured to perform a motion compensation stage for the current block using one or more refined motion vectors of the previously coded blocks to generate the prediction block for the current block.

Clause 84: The device of clause 83, wherein the one or more processors are configured to generate a motion vector candidate list for the current block using the one or more unrefined motion vectors of the previously coded blocks.

Clause 85: The device of any of clauses 73-84, wherein the one or more processors are configured to derive the motion vector for the current block according to template matching (TM), including using only neighboring reconstruction samples to form a current block template for TM.

Clause 86: The device of any of clauses 73-85, wherein the one or more processors are further configured to encode the current block prior to decoding the current block.

Clause 87: The device of any of clauses 73-86, further comprising a display configured to display the decoded video data.

Clause 88: The device of any of clauses 73-87, wherein the device comprises one or more of a camera, a computer, a mobile device, a broadcast receiver device, or a set-top box.

Clause 89: A computer-readable storage medium having stored thereon instructions that, when executed, cause a processor to: determine a deterministic bounding box from which to retrieve reference samples of reference pictures of video data for performing decoder-side motion vector derivation (DMVD) for a current block of the video data; derive a motion vector for the current block according to DMVD using the reference samples within the deterministic bounding box; form a prediction block using the motion vector; and decode the current block using the prediction block.

Clause 90: The computer-readable storage medium of clause 89, wherein the instructions that cause the processor to derive the motion vector comprise instructions that cause the processor to: perform a motion field reconstruction stage using one or more unrefined motion vectors of previously coded blocks to the current block; and perform a reference sample fetching stage using the one or more unrefined motion vectors of the previously coded blocks, and wherein the instructions that cause the processor to form the prediction block comprise instructions that cause the processor to perform a motion compensation stage for the current block using one or more refined motion vectors of the previously coded blocks to generate the prediction block for the current block.

Clause 91: The computer-readable storage medium of any of clauses 89 and 90, wherein the instructions that cause the processor to derive the motion vector for the current block according to DMVD comprise instructions that cause the processor to derive the motion vector for the current block according to template matching (TM), including using only neighboring reconstruction samples to form a current block template for TM.

Clause 92: A device for decoding video data, the device comprising: means for determining a deterministic bounding box from which to retrieve reference samples of reference pictures of video data for performing decoder-side motion vector derivation (DMVD) for a current block of the video data; means for deriving a motion vector for the current block according to DMVD using the reference samples within the deterministic bounding box; means for forming a prediction block using the motion vector; and decoding the current block using the prediction block.

Clause 93: The device of clause 92, wherein the means for deriving the motion vector comprises: means for performing a motion field reconstruction stage using one or more unrefined motion vectors of previously coded blocks to the current block; and means for performing a reference sample fetching stage using the one or more unrefined motion vectors of the previously coded blocks, and wherein the means for forming the prediction block comprises means for performing a motion compensation stage for the current block using one or more refined motion vectors of the previously coded blocks to generate the prediction block for the current block.

Clause 94: The device of any of clauses 92 and 93, wherein the means for deriving the motion vector for the current block according to DMVD comprises means for deriving the motion vector for the current block according to template matching (TM), including using only neighboring reconstruction samples to form a current block template for TM.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    retrieving an unrefined motion vector from a neighboring block to a current block of video data;
    determining a deterministic bounding box from which to retrieve a first set of reference samples of one or more reference pictures of video data for performing decoder-side motion vector derivation (DMVD) for the current block of the video data, the deterministic bounding box corresponding to a position indicated by the unrefined motion vector;
    retrieving the first set of reference samples of the one or more reference pictures;
    after retrieving the first set of reference samples, determining a DMVD method for the current block;
    deriving a motion vector for the current block according to the determined DMVD method using the first set of reference samples and the unrefined motion vector;
    retrieving a second set of reference samples from the one or more reference pictures using the motion vector;
    forming a prediction block using the motion vector and the second set of reference samples; and
    decoding the current block using the prediction block.

2. The method of claim 1, wherein determining the deterministic bounding box comprises
    determining the deterministic bounding box according to the unrefined motion vector.

3. The method of claim 2, wherein determining the deterministic bounding box comprises determining the deterministic bounding box as having an area including samples within N samples of a sample indicated by the unrefined motion vector.

4. The method of claim 3, wherein N is a predefined value determined according to a multiple of an internal motion vector storage precision.

5. The method of claim 3, wherein N is the same for each of template matching (TM), bilateral merge (BM), decoder-side motion vector refinement (DMVR), or multi-pass DMVR.

6. The method of claim 1, wherein determining the deterministic bounding box comprises determining the deterministic bounding box according to an interpolation filter length for DMVD.

7. The method of claim 1, wherein deriving the motion vector comprises performing a motion search starting within the deterministic bounding box.

8. The method of claim 1, wherein the determined DMVD method comprises one of template matching (TM), bilateral merge (BM), decoder-side motion vector refinement (DMVR), or multi-pass DMVR.

9. The method of claim 1,
    wherein retrieving the first set of reference samples comprises:
        performing a motion field reconstruction stage using the unrefined motion vector of the neighboring block to the current block; and
        performing a reference sample fetching stage using the unrefined motion vector of the neighboring block to the current block to retrieve the first set of reference samples, and
    wherein forming the prediction block comprises performing a motion compensation stage for the current block using one or more refined motion vectors of previously coded blocks to generate the prediction block for the current block.

10. The method of claim 9, further comprising generating a motion vector candidate list for the current block using the unrefined motion vectors of the neighboring block.

11. The method of claim 1, wherein deriving the motion vector for the current block according to the determined DMVD method comprises deriving the motion vector for the current block according to template matching (TM), including using only neighboring reconstruction samples to form a current block template for TM.

12. The method of claim 1, further comprising encoding the current block prior to decoding the current block.

13. A device for decoding video data, the device comprising:
    a memory configured to store video data; and
    a processing system implemented in circuitry and configured to:
        retrieve an unrefined motion vector from a neighboring block to a current block of video data;
        determine a deterministic bounding box from which to retrieve a first set of reference samples of one or more reference pictures of the video data for performing decoder-side motion vector derivation (DMVD) for the current block of the video data, the deterministic bounding box corresponding to a position indicated by the unrefined motion vector;

retrieve the first set of reference samples of the one or more reference pictures;

after retrieving the first set of reference samples, determine a DMVD method for the current block;

derive a motion vector for the current block according to the determined DMVD method using the first set of reference samples and the unrefined motion vector;

retrieve a second set of reference samples from the one or more reference pictures using the motion vector;

form a prediction block using the motion vector and the second set of reference samples; and decode the current block using the prediction block.

14. The device of claim 13, wherein to determine the deterministic bounding box, the processing system is configured to determine the deterministic bounding box according to the unrefined motion vector.

15. The device of claim 14, wherein the processing system is configured to determine the deterministic bounding box as having an area including samples within N samples of a sample indicated by the unrefined motion vector.

16. The device of claim 15, wherein N is a predefined value determined according to a multiple of an internal motion vector storage precision.

17. The device of claim 15, wherein N is the same for each of template matching (TM), bilateral merge (BM), decoder-side motion vector refinement (DMVR), or multi-pass DMVR.

18. The device of claim 13, wherein the processing system is configured to determine the deterministic bounding box according to an interpolation filter length for DMVD.

19. The device of claim 13, wherein to derive the motion vector, the processing system is configured to perform a motion search starting within the deterministic bounding box.

20. The device of claim 13, wherein the determined DMVD method comprises one of template matching (TM), bilateral merge (BM), decoder-side motion vector refinement (DMVR), or multi-pass DMVR.

21. The device of claim 13,
wherein to retrieve the first set of reference samples, the processing system is configured to:
perform a motion field reconstruction stage using the unrefined motion vector of the neighboring block to the current block; and
perform a reference sample fetching stage using the unrefined motion vector of the neighboring block to the current block to retrieve the first set of reference samples, and
wherein to form the prediction block, the processing system is configured to perform a motion compensation stage for the current block using one or more refined motion vectors of previously coded blocks to generate the prediction block for the current block.

22. The device of claim 21, wherein the processing system is configured to generate a motion vector candidate list for the current block using the unrefined motion vector of the neighboring block.

23. The device of claim 13, wherein the are processing system is configured to derive the motion vector for the current block according to template matching (TM), including using only neighboring reconstruction samples to form a current block template for TM.

24. The device of claim 13, wherein the processing system is further configured to encode the current block prior to decoding the current block.

25. The device of claim 13, further comprising a display configured to display the decoded video data.

26. The device of claim 13, wherein the device comprises one or more of a camera, a computer, a mobile device, a broadcast receiver device, or a set-top box.

27. A computer-readable storage medium having stored thereon instructions that, when executed, cause a processor to:

retrieve an unrefined motion vector from a neighboring block to a current block of video data;

determine a deterministic bounding box from which to retrieve a first set of reference samples of one or more reference pictures of video data for performing decoder-side motion vector derivation (DMVD) for the current block of the video data, the deterministic bounding box corresponding to a position indicated by the unrefined motion vector;

retrieve the first set of reference samples of the one or more reference pictures;

after retrieving the first set of reference samples, determine a DMVD method for the current block;

derive a motion vector for the current block according to the determined DMVD method using the first set of reference samples and the unrefined motion vector;

retrieve a second set of reference samples from the one or more reference pictures using the motion vector;

form a prediction block using the motion vector and the second set of reference samples; and decode the current block using the prediction block.

28. The computer-readable storage medium of claim 27, wherein the instructions that cause the processor to retrieve the first set of reference samples comprise instructions that cause the processor to:
perform a motion field reconstruction stage using the unrefined motion vector of the neighboring block to the current block; and
perform a reference sample fetching stage using the unrefined motion vector of the neighboring block to the current block to retrieve the first set of reference samples, and
wherein the instructions that cause the processor to form the prediction block comprise instructions that cause the processor to perform a motion compensation stage for the current block using one or more refined motion vectors of previously coded blocks to generate the prediction block for the current block.

29. The computer-readable storage medium of claim 27, wherein the instructions that cause the processor to derive the motion vector for the current block according to the determined DMVD method comprise instructions that cause the processor to derive the motion vector for the current block according to template matching (TM), including using only neighboring reconstruction samples to form a current block template for TM.

30. A device for decoding video data, the device comprising:

means for retrieving an unrefined motion vector from a neighboring block to a current block of video data;

means for determining a deterministic bounding box from which to retrieve a first set of reference samples of one or more reference pictures of video data for performing decoder-side motion vector derivation (DMVD) for the current block of the video data, the deterministic bounding box corresponding to a position indicated by the unrefined motion vector;

means for retrieving the first set of reference samples of the one or more reference pictures;

means for determining a DMVD method for the current block after retrieving the first set of reference samples;

means for deriving a motion vector for the current block according to the determined DMVD method using the reference samples and the unrefined motion vector;

means for retrieving a second set of reference samples from the one or more reference pictures using the motion vector;

means for forming a prediction block using the motion vector and the second set of reference samples; and means for decoding the current block using the prediction block.

31. The device of claim 30, wherein the means for retrieving the first set of reference samples comprises:

means for performing a motion field reconstruction stage using the unrefined motion vector of the neighboring block to the current block; and means for performing a reference sample fetching stage using the unrefined motion vector of the neighboring block to the current block to retrieve the first set of reference samples, and wherein the means for forming the prediction block comprises means for performing a motion compensation stage for the current block using one or more refined motion vectors of previously coded blocks to generate the prediction block for the current block.

32. The device of claim 30, wherein the means for deriving the motion vector for the current block according to the determined DMVD method comprises means for deriving the motion vector for the current block according to template matching (TM), including using only neighboring reconstruction samples to form a current block template for TM.

* * * * *